(12) United States Patent
Daynes et al.

(10) Patent No.: US 7,644,402 B1
(45) Date of Patent: *Jan. 5, 2010

(54) METHOD FOR SHARING RUNTIME REPRESENTATION OF SOFTWARE COMPONENTS ACROSS COMPONENT LOADERS

(75) Inventors: Laurent Daynes, Fontaine Amelie (FR); Grzegorz Czajkowski, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1232 days.

This patent is subject to a terminal disclaimer.

(21) Appl. No.: 10/803,585

(22) Filed: Mar. 17, 2004

(51) Int. Cl.
*G06F 9/44* (2006.01)
(52) U.S. Cl. .................. 717/166; 717/165; 717/162
(58) Field of Classification Search ............... 717/166, 717/165
See application file for complete search history.

(56) References Cited

U.S. PATENT DOCUMENTS

| | | | | |
|---|---|---|---|---|
| 6,430,569 B1 * | 8/2002 | Bracha et al. | ........... | 707/103 R |
| 6,738,977 B1 * | 5/2004 | Berry et al. | .................. | 719/332 |
| 6,813,762 B1 * | 11/2004 | Plaxton | ....................... | 717/148 |
| 6,829,761 B1 * | 12/2004 | Sexton et al. | .............. | 717/165 |
| 6,910,128 B1 * | 6/2005 | Skibbie et al. | .............. | 713/170 |
| 6,938,247 B2 * | 8/2005 | Czajkowski | ................. | 717/151 |
| 2002/0129177 A1 * | 9/2002 | McGuire et al. | ............ | 709/315 |

OTHER PUBLICATIONS

Altera Corporation, "The Need For Dynamic Phase Alignment In High-Speed FPGAs", *WP-STXGXDPA*, Ver. 1.1, pp. 1-5 (Feb. 2004).
Arnold, et al., "Adaptive Optimization in the Jalapeño JVM", in *ACM SIGPLAN Conference on Object-Oriented Programming, Systems, Languages, and Applications, OOPSLA '00*, pp. 47-65 (2000).
Cohen, et al., "Automatic Program Transformation with JOIE", in *USENIX Annual Technical Conference* (No. 98), pp. 167-178 (1988).
Czajkowski, et al., "Multitasking Without Compromise: a Virtual Machine Evolution", in *ACM Conference on Object-Oriented Programming, Systems, Languages, and Applications*, (00PSLA '01), 14 pages (2001).

(Continued)

*Primary Examiner*—Insun Kang
(74) *Attorney, Agent, or Firm*—Martine Penilla & Gencarella, LLP

(57) ABSTRACT

A method for reducing a usage of main memory by a first class loader and a second class loader is provided. The first class loader and the second class loader are capable of dynamically loading a class having a class file, and translating the class file into a first and a second class type, respectively. The method includes dividing a runtime representation of the first class type into a first loader independent part and a first loader dependent part. Also included is determining whether a runtime representation of the second class type can use the first loader independent part of the runtime representation of the first class type. If the first loader independent part can be used, the method includes generating a second loader dependent part of the runtime representation of the second class type using the first loader independent part of the runtime representation of the first class type.

26 Claims, 21 Drawing Sheets

OTHER PUBLICATIONS

Czajkowski, et al., "Code Sharing Among Virtual Machines", in *European Conference on Object Oriented Programming*, ECOOP, Barcelona, Spain, 23 pages (2002).

Czajkowski, et al., "A Multi-User Virtual Machine", to be published in *USENIX Annual Technical Conference*, 14 pages, San Antonio, TX (2003).

Dillenberger, et al., "Building a Java™ Virtual Machine for Server Applications: The Jvm on OS/390", *IBM Systems Journal*, vol. 39(1), pp. 194-210 (2000).

Gosling, et al., "The Java™ Language Specification The Java™ Series", *Addison Wesley, 2nd Edition* (Sep. 2000).

Hölzle, et al., "Optimizing Dynamically-Typed Object-Oriented Languages With Polymorphic Inline Caches", *ECOOP '91 Proceedings, published as Springer Verlag Lecture Notes in Computer Science 512*, pp. 1-18, Berlin (1991), Geneva (1991).

IBM, "New IBM Technology Featuring Persistent Reusable Java Virtual Machines", *IBM, IBM Developer Kit for OS/390, Java™*, Second Technology Edition, pp. 1-122 (Oct. 2001).

Liang, et al., "Dynamic Class Loading in the Java™ Virtual Machine," in *13th Annual ACM SIGPLAN Conference on Object-Oriented Programming Systems, Languages, and Applications*, OOPSLA '98, pp. 36-44 (Oct. 1998).

Niemeyer, "BeanShell—Lightweight Scripting for Java", http://www.beanshell.org (2002).

Author Unknown, "Secure Hash Standard" *U. D. of Commerce, National Institute of Standards and Technology, Computer Systems Laboratory*, Federal information Processing Standards Publication 180-1 (FIPS PUB 180-1) (Apr. 1995).

Serrano, et al., "Quicksilver: A Quasi-Static Compiler for Java", in *ACM Conference on Object-oriented Programming, Systems, Languages, and Applications* (OOPSLA), pp. 66-82 (2000).

Wong, "Dynamically Loaded Classes as Shared Libraries: and Approach to Improving Virtual Machine Scalability", in *Proceedings of IEEE International Parallel and Distributed Processing Symposium (IPDPS)*, nice, France (2003).

\* cited by examiner

METHOD FOR SHARING RUNTIME REPRESENTATION OF SOFTWARE COMPONENTS ACROSS COMPONENT LOADERS

CROSS REFERENCE TO RELATED APPLICATIONS

This application is related to U.S. patent application Ser. No. 10/803,205, filed on Mar. 17, 2004, issued on Jul. 29, 2008 with U.S. Pat. No. 7,406,687, and entitled "SHARING RUNTIME REPRESENTATION OF SOFTWARE COMPONENT METHODS ACROSS COMPONENT LOADERS." The disclosure of this application, which is assigned to Sun Microsystems, Inc., the assignee of the subject application, is incorporated herein by reference.

BACKGROUND

1. Field of the Invention

This invention relates generally to the Java™ platform, and more particularly to methods and systems for minimizing main memory consumption associated with defining class loading policies in Java.

2. Description of the Related Art

Today, several high-level programming languages are being offered to the computer programmers and software developers, one of which is Java™. Pervasive use of Java in a relatively short period of time can at least in part, be credited to Java platform independence, object orientation, and dynamic nature. Java also eliminates many of the monotonous and error-prone tasks performed by an application programmer or developer, including memory management and cross-platform porting. In this manner, Java has liberated programmers to focus on the design and functionalities of the applications.

One of many distinctive features of Java programming language, and one that is extensively exploited by application programmers, is the ability to program class loaders and defining class loading policies. Currently, a wide range of applications exploit class loaders including, scripting environment with runtime introspection capabilities, Integrated Development Environments (IDEs), bytecode transformation tools, aspect-oriented programming environment, web browsers, servlet engines, and application servers.

Class loaders (herein also referred to as "loaders") are mechanisms for dynamically loading software components in a running program. Loaders allow a program to define a class in separate namespaces and to control the location from where the architecturally-neutral definition of the class can be obtained. Having the ability to create separate namespaces for a class allows a program to load the same or different definitions of a class multiple times using the same name. Although a class loaded by different loaders has the same name and may have the same definition, the loaded classes, are treated as distinct types. In this manner, isolation is provided to some extent such that different software components can be loaded by a software program without any interference, even though software components may contain classes having the same name. For instance, an applet container for a web-browser can load multiple applets using different loaders. Although the classes loaded for each applet may have the same name, the Java virtual machine (JVM) can treat the loaded classes as if the classes have different types.

Loaders can also provide the opportunity to transparently enhance code generated at runtime by a third-party. For instance, loaders allow interception of the code and modification of the code (via bytecode transformation) before the code is linked with the rest of the program that is running. Loaders also allow software programs to generate and load a class file at runtime.

Using class loaders, however, does not come without a cost. For instance, current implementations of the JVM typically create a runtime representation of a class in memory for each class loader that defines the class. Creating the runtime representation is performed even though another class having the same name and architecturally-neutral representation has already been created by a different loader. As a consequence, the effort in creating an optimized runtime representation is needlessly repeated and the runtime representation of classes are unnecessarily replicated in memory. Examples of such replicated efforts include, repeating the same parsing of the same class file, construction of a main-memory runtime representation, bytecode verification, quickening of bytecodes, resolution of constants and symbols, and identification and dynamic compilation of frequently used methods.

One way application programmers can circumvent the cost associated with replicating the entire runtime representation of a class is using delegation relationships between class loaders. Namely, when a class loader has been requested to load a class, the class loader may delegate the definition of the class to a different class loader that has already defined the class. Unfortunately, as the complexity degree of delegation relationships increases so can the extent and possibility of generating errors. Additionally, delegating the definition of a class to another class loader may not always be possible per-design. For instance, delegation relationships cannot be used in a situation where software components are to be isolated, as required by an application (e.g., loading multiple applets in an applet container).

There have been certain attempts to share the main-memory runtime representation of classes between multiple software programs being executed. One approach has been to launch a separate operating system (OS) process to execute separate instances of the JVM for every Java program, and to store the sharable part of the runtime representation of classes in a memory area shared among the operating system processes.

Another solution is to encode the entire runtime representation of classes in a binary format that is natively supported by the host OS shared libraries mechanism. For instance, the main-memory representation of classes can be encoded in the Extremely Low Frequency (ELF) format, thus generating binary codes that can be relocated. In such a scenario, loading and relocation of the binary codes are performed by a linker of the OS.

Yet another solution is to share the runtime representation of classes serially. In the latter approach, a JVM that has been launched once can be re-used by an arbitrary number of software programs as long as the software programs adhere to a set of rules analogous to the rules required in a middleware environment (e.g., Java 2 Platform, Enterprise Edition (J2EE)). However, in such an approach, software programs cannot use Abstract Windowing Toolkit (AWT), set global static variables of classes shared serially, start arbitrary threads, use native methods, etc.). Failure to comply with the set of rules prompts the creation of a new JVM instance, and thus, the associated costs.

Still another solution is to collocate all Java programs in the same OS process, and to execute the Java programs with a single JVM capable of multi-tasking.

Nevertheless, all of the above-mentioned approaches, share the same limitations. Specifically, none of the approaches is capable of sharing, to any degree, the runtime representation of classes defined by arbitrary user-defined class loaders. Rather, mostly classes defined by the boot class loader (i.e., the loader used at JVM startup to load the so-called "core" classes that are associated with the JVM implementation (e.g., java.lang.Object, java.lang.Class, etc.)), or the system class loader (i.e., class loader used to load the class defining the entry point to a software program (i.e., the static main (String [ ]) method of the class, etc.), can have respective runtime representations shared by multiple software programs. Limiting sharing of runtime representation of classes to the loaders being fully controlled by the JVM (e.g., the boot and system loaders) can simplify re-entrance by preventing the symbolic links to resolve into potentially different definitions of the same class.

In contrast to the classes defined by the boot class loader or the system class loader, user-defined class loaders can implement any number of arbitrary policies to obtain the definition of a class (including, but not limited to, modifying a class file fetched from a known location on the fly, or generating a class file from scratch on the fly, etc.). As a consequence, two loaders that define the same class might resolve symbolic links being used by the class differently. None of the above-mentioned approaches, however, allow sharing of the runtime representation of classes under such condition. Hence, none of the above-mentioned approaches can address the problem of reducing the footprint of the software programs exploiting user-defined class loaders.

In view of the foregoing, a need therefore exists in the art for systems and methods capable of increasing main memory conservation by allowing sharing of runtime representation of software components by a plurality of component loaders.

SUMMARY

Broadly speaking, the present invention fills this need by providing systems and methods capable of increasing main memory conservation while minimizing runtime costs by allowing sharing of runtime representation of a software component by a plurality of component loaders. In one example, the software component is a dynamically loaded architecturally-neutral software component. In another embodiment, the software component is a Java™ class and the plurality of component loaders is class loaders. According to one embodiment, the runtime representation of the class can be shared across the plurality of class loaders if certain sharing conditions have been satisfied. It should be appreciated that the present invention can be implemented in numerous ways, including as a process, an apparatus, a system, a device, or a method. Several inventive embodiments of the present invention are described below.

In one embodiment, a method for reducing a usage of main memory by a first class loader and a second class loader is provided. The first class loader and the second class loader are capable of dynamically loading a class having a class file. The first class loader is capable of translating the class file into a first class type and the second class loader is capable of translating the class file into a second class type. The method includes dividing a runtime representation of the first class type into a first loader independent part and a first loader dependent part. The method further includes determining whether a runtime representation of the second class type can use the first loader independent part of the runtime representation of the first class type. If the first loader independent part of the runtime representation of the first class type can be used by the runtime representation of the second class type, the method also includes generating a second loader dependent part of the runtime representation of the second class type using the first loader independent part of the runtime representation of the first class type.

In another embodiment, a method for using a first loader independent part of a runtime representation of a software component as a second loader independent part of a runtime representation of the software component is provided. The first loader independent part of the runtime representation of the software component is defined by a first component loader and the second loader independent part of the runtime representation of the software component is defined by the second loader. The method includes determining a satisfaction of a first condition, a second condition, and a third condition. The first condition is satisfied when a first binary representation of the first software component being the same as a second binary representation of the second software component used by the second component loader to define a second software component type. The second condition is satisfied when a second loader independent part of a runtime representation of a super software component type of the second software component type is the same as a loader dependent runtime representation of a super software component type of the first software component type. The third condition is satisfied when the second software component type has the same unimplemented methods as the first software component type.

In yet another embodiment, a computer program embodied on a computer readable medium for reducing a usage of main memory by a first class loader and a second class loader is provided. The first class loader and the second class loader are capable of dynamically loading a class having a class file. The first class loader is capable of translating the class file into a first class type and the second class loader is capable of translating the class file into a second class type. The computer program includes program instructions for dividing a runtime representation of the first class type into a first loader independent part and a first loader dependent part. The computer program also includes program instructions for determining whether a runtime representation of the second class type can use the first loader independent part of the runtime representation of the first class type. If the first loader independent part of the runtime representation of the first class type can be used by the runtime representation of the second class type, the computer program includes program instructions for generating a second loader dependent part of the runtime representation of the second class type using the first loader independent part of the runtime representation of the first class type.

In still another embodiment of the present invention, a computer program embodied on a computer readable medium for using a first loader independent part of a runtime representation of a software component as a second loader independent part of a runtime representation of the software component is provided. The first loader independent part of the runtime representation of the software component is defined by a first component loader and the second loader independent part of the runtime representation of the software component is defined by the second loader. The computer program includes program instructions for determining a satisfaction of a first condition, a second condition, and a third condition. The first condition is satisfied when a first binary representation of the first software component is the same as a second binary representation of the second software component used by the second component loader to define a second software component type. The second condition is satisfied when a second loader independent part of a runtime representation of a super software component type of the second software component type is the same as a loader independent runtime representation of a super software component type of the first software component type. The third condition is satisfied when the second software component type has the same unimplemented methods as the first software component type.

Other aspects of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

Figure 1A:
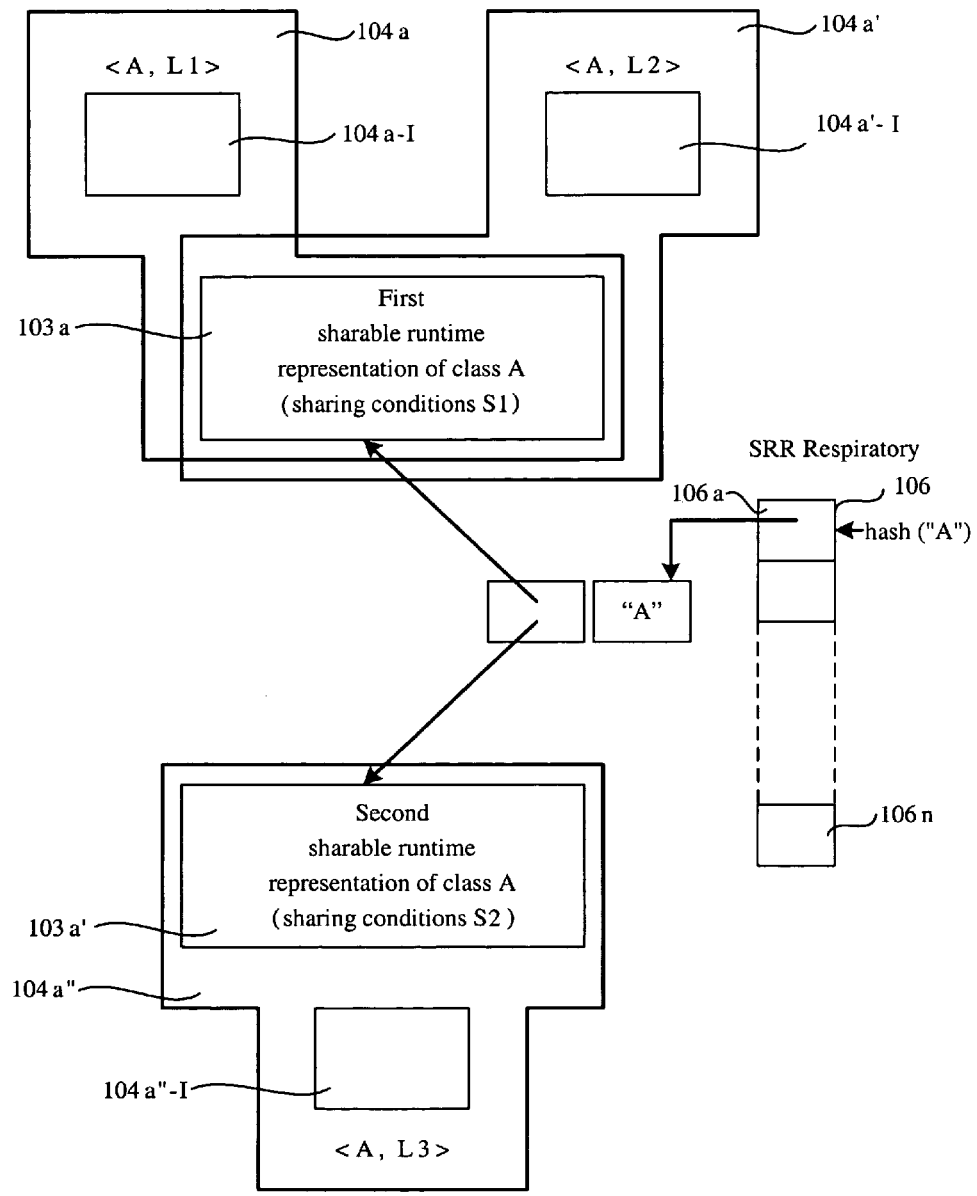
FIG. 1A is a simplified block diagram illustrating an exemplary JVM implementation wherein the runtime representation of a class type is shared between different class loaders, in accordance with one embodiment of the present invention.

Inventions for reducing main memory usage and runtime costs by sharing a portion of the runtime representation of a software component across a plurality of component loaders are provided. Several exemplary embodiments of the invention will now be described in detail with reference to the accompanying drawings.

The embodiments of the present invention provide methods and systems for sharing a portion of runtime representation of a software component across a plurality of component loaders. In one embodiment, software components are classes and component loaders are class loaders. According to one implementation, the runtime representation of a class is divided into two parts, a class loader independent part, and a class loader dependent part. The class loader independent part can include most of the runtime representation of a class and is sharable across multiple class loaders that define the class and satisfy a set of sharing conditions. The class loader dependent part is replicated for each of the class loaders that define the class.

According to one embodiment, bytecode interpretation is made loader re-entrant thus allowing the bytecode of methods to be shared across multiple defining class loaders. As used herein, class loader re-entrant bytecode interpretation means that data structures necessary for interpreting bytecodes (including the bytecodes) do not assume states or directly reference data that is specific to a class loader (e.g., the initialization state of a class, a pointer to a resolved symbolic link, etc.). Instead, the bytecode interpreter is capable of efficiently retrieving loader dependent data and states, and of triggering loader dependent events (e.g., class initialization, symbolic link resolution, etc.).

In one example, re-entrance with respect to class initialization is achieved by adding class initialization barriers to the interpretation of some bytecodes. In another example, re-entrance with respect to symbolic links is achieved by adding link resolution barriers to the interpretation of some bytecodes. Both class initialization and link resolution barriers are achieved by a combination of data structures and sequence of instructions that can exploit the data structures.

In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

I. Environment Description

As embodiments of the present invention can implement the Java™ platform, an overview of the Java™ programming language (hereinafter "Java") is provided below. Programs written in Java (hereinafter "Java program") are composed of one of more classes that are compiled by a Java compiler into class files wherein a respective class file is generated for each corresponding class of a program. Class files have architecturally-neutral binary formats and can contain bytecodes, a symbol table, and ancillary information. The symbol table can comprise symbolic references to fields, methods, and names of the classes used by the class being represented by the class file. Class files are machine-independent and can be executed by a Java™ Virtual Machine (hereinafter "JVM").

The JVM is an abstract machine that can provide a level of abstraction between the machine independence of the bytecode in class files and the machine-dependent instruction set of a particular computer hardware. Each JVM is developed to operate in conjunction with one particular operating system on a particular hardware. Class files compiled from Java classes can be executed on any computer system equipped with a JVM. In this manner, Java programs can be ported from one computer system to another without requiring updating of the program code or recompilation of the program classes into class files.

In operation, a user of a typical Java-based system interacts with an application that embeds a JVM, for instance, a web-browser or a web-server. The application creates an instance of the JVM and supplies the instance of the JVM with an initial class that contains the main method of the application, for instance, a Java web server. The JVM executes the bytecodes of the main method, using a combination of the bytecode interpretation and executed native machine code produced by the compilation of the bytecodes with a dynamic compiler. Classes required for executing the program are loaded, as needed, using class loaders.

II. Sharing Runtime Representation of a Software Component Across a Plurality of Software Component Loaders As one embodiment of the present invention is a JVM capable of sharing the runtime representation of classes between a plurality of class loaders, a brief description of classes and class loaders is provided herein. Class loaders are a mechanism for dynamically loading software components in an executing program, wherein the unit of software distribution is a class. Classes are distributed using a standard architecturally-neutral binary representation known as the class file format. Each class is represented by a single class file produced by a Java compiler. Class files can be stored in actual files, in a memory buffer, or be obtained from a network stream. Class files can be loaded by any implementation of the JVM to define a class type.

Within a program, a class type is uniquely identified by a class name and a namespace. Thus, two classes with the same name can be defined in different namespace and can be treated as different types. Even though the two classes have the same names, the two classes can be defined from different class files and can therefore be completely unrelated.

The JVM implements namespaces as class loaders. Both class types and class loaders have a representation in user code. Specifically, class types are represented as instances of the class java.lang.Class while class loaders are represented as instances of the class java.lang.ClassLoader.

Class loaders are used by the JVM to obtain the class files necessary to create the class types needed by a program. By way of example, when executing a method, the JVM may need to resolve a symbolic link to a class named "C." If the JVM cannot find a runtime representation for the class named C in the loader defining the class which method is being executed, the JVM requests that the loader define the class named C. In one example, the loader defining the class which method is being executed is called the initiating loader of class C. The initiating loader returns the instance of the class java.lang.Class representing the defined class type in Java code to the JVM. The JVM obtains the runtime representation of the defined class from the instance of java.lang.Class, and uses same to complete the link resolution.

The initiating loader of class C can be the defining loader of class C. Alternatively, the initiating loader can forward the request to another class loader. In such scenario, the initiating loader is said to delegate the loading of class C to another loader called the delegatee. The delegatee may in turn forward the request to yet another class loader. Forwarding the request continues until one of the delegatees defines class C. The loader that defines class C is called the defining loader of class C.

The defining loader L of class C obtains a class file containing the architecture-neutral binary representation of class C from some location. At this point, the defining loader passes the class file to the JVM, which in turn, builds the runtime representation of the class type of class C defined by loader L. The JVM returns an instance of the class java.lang.Class representing the class type in Java code. The loader, in turn, returns the instance of the class java.lang.Class to the loader responsible for delegating the definition of class C to loader L if such a loader exists. However, if such a loader does not exist, the instance of the class java.lang.Class is sent to the JVM if JVM has requested that loader L define class C.

In one embodiment, the behavior of class loaders can be defined by application programmers through sub-classing the ClassLoader class and overriding the "loadClass" method of the ClassLoader class. The sub-classing mechanism enables application programmers to control the manner class loaders delegate the loading of classes to other loaders as well as the location of the class file that can be used to define a class. For example, a class loader may obtain a class file from a network connection to a remote site, may generate the class file from the onset, or may transparently enhance an existing class file by adding additional features to the existing class file (e.g., automatic persistence, resource management, profiling, etc.), etc. Such user-defined class loaders can also assign appropriate security attributes to classes that are loaded from a certain source. For more information on class loaders, reference can be made to a White Paper entitled "Dynamic Class Loading in the Java™ Virtual Machine," by Sheng Liang and Gilad Bracha, dated October 1998.

In one example, programs are executed by at least the boot loader and the system loader, each of which is a system defined class loader. The boot loader can be used at JVM startup to load the so-called "core" classes. In one example, core classes (e.g., java.lang.Object, java.lang.Class, etc.) are closely associated with the JVM implementation. Loading of core classes can be fully controlled by the JVM. For example, the JVM can determine the location of class files to be obtained. The system class loader is the loader created by the JVM to load the class that defines the entry point to a program (i.e., the static main (String [ ]) method of the class). In one embodiment, software programs can create additional class loaders to serve the needs of the programs.

For simplicity and ease of reference, a class type is described using the notation $<C, Ld>^{Li}$, where C denotes the name of the class, Ld denotes the defining loader of the class, and Li denotes the initiating loader. When the initiating class loader is not relevant, the simplified notation $<C, Ld>$ can be used instead of $<C, Ld>^{Li}$. When the defining class loader is not relevant, the simplified notation $C^{Li}$ can be used instead of $<C, Ld>^{Li}$. By definition, $<C, L1>=<C, L2>$ implies $L1=L2$. The notation "~" is used to denote that two distinct class types can share respective runtime representations (i.e., the two distinct class types satisfy the three sharing conditions). For conciseness, the notation $<C, L1>\cong<C, L2>$ is used to denote that $<C, L1>\sim<C, L2>\|<C, L1>=<C, L2>$, wherein "$\|$" is the Boolean operator "or." In other words, $<C, L1>\cong<C, L2>$ means that $<C, L1>$ and $<C, L2>$ are either the same type, or share the runtime representation.

Keeping the overviews to Java and class loaders in mind, reference is made to a simplified high level block diagram shown in FIG. 1A depicting an exemplary JVM implementation of the present invention wherein the runtime representation of a class type is shared between different class loaders, in accordance with one embodiment of the present invention. FIG. 1A shows a runtime representation of a class type <A, L1> (i.e., class A defined by a loader L1) 104*a*, a class type <A, L2> (i.e., class A defined by a loader L2) 104*a'*, and a class type <A, L3> (i.e., class A defined by a loader L3) 104*a"*. As can be seen, the runtime representation of each class type 104*a*-104*a"* includes a sharable portion that can be shared with other runtime representation of other class types, and a non-sharable portion. For example, the class type <A, L1> 104*a* includes a first sharable runtime representation (SRR) of class A 103*a* that the class type 104*a* can share with the class type <A, L2> 104*a'*. In a like manner, the class type <A, L3> 104*a"* includes a second SRR of class A 103*a'*. As illustrated, the second SRR of class A 103*a'* is not being shared with any of the class type runtime representations 104*a* and 104*a'*. Runtime representations of class A <A, L1> 104*a*, <A, L2> 104*a'*, and <A, L3> 104*a"* also include non-sharable portions of class type runtime representations 104*a*-I, 104*a'*-I, and 104*a"*-I, respectively.

In one embodiment of the present invention, the JVM records almost all the SRRs 103*a* and 103*b* created by the JVM in a SRR repository 106. In one example, the SRR repository 106 can be implemented as a hash table that may be keyed on class names for fast retrieval. As can be seen, each entry 106*a*-106*n* of SRR repository 106 can contain a list of SRRs 103*a* and 103*a'*. Specifically, each entry of the SRR repository 106 can include a list of all the SRRs for classes of the same name.

In one embodiment, the non-sharable portions of class type runtime representations 104*a*-I, 104*a'*-I, and 104*a"*-I are loader dependent. That is, the non-sharable portions of the class type runtime representations 104*a*-I, 104*a'*-I, and 104*a"*-I include states, or refer directly to data structures that are specific to each loader L1, L2, and L3, respectively. The sharable portions of class type runtime representations 103*a* and 103*a'* are loader independent. However, each of the sharable portions of class type runtime representations 103*a* and 103*a'* is bound to a set of sharing conditions (e.g., sharing conditions S1 for the first SRR 103*a*, and S2 for the second SRR 103*b*, etc.). In one embodiment, a loader can use an existing SRR of the class type for the class the loader has defined if the class satisfies the sharing conditions bound to the SRR. For example, <A, L3> 104*a"* does not satisfy the sharing conditions S1 and therefore, cannot use the SRR of class A 103*a*. However, <A, L3> 104*a"* can satisfy the sharing conditions S2, and as such, can therefore use the SRR of class A 103*a'*. In one embodiment of the present invention, the loader can use an existing SRR of the class type of the class that has been defined by the class loader if the class satisfies three sharing conditions. Below are more details regarding the three sharing conditions and the manner the sharing conditions can be used.

According to one embodiment of the present invention, the sharing conditions can simplify sharing of the runtime representation of class types. For instance, the sharing conditions can ensure that two class types satisfying the same sharing conditions can declare the same static and instance variables. That is, the variables, irrespective of being defined directly by the class or inherited, have the same name, protection level, and primitive type (i.e., byte, character, Boolean, integer, float, long, double type or reference type) in both class types. Thus, the variables with the same name can be assigned the same offset within the variables holder regardless of the class type of the holder. An implementation of the JVM can exploit such property to lay out identically the instances of class types that satisfy the same sharing conditions. Such property can be exploited further to share the runtime data structures holding the description of variables among class types. In one example, the runtime data structures holding the description of variables can include offset within the variable holder, protection level, signature, and name of the variables.

The sharing conditions can further ensure that methods of two class types that satisfy the same sharing conditions have the same name, signature, protection level, and bytecodes, whether the methods are inherited or declared directly by classes. For instance, using such property, an implementation of the JVM can share the runtime representation of methods and lay out, identically, the virtual table of class types satisfying the same sharing conditions. In one embodiment, the runtime representation of methods can include bytecodes as well as other descriptive data (e.g., method name, signature, protection level, etc.). The runtime representation of methods can further arrange for methods to be assigned the same index in the virtual method table of respective class types.

Yet further, sharing conditions can ensure that two class types satisfying the same sharing conditions implement interfaces that have the same name and the same unimplemented methods. However, in one embodiment, the sharing conditions may not require that the interfaces declare the same methods. An example of such a scenario is shown in Table 1 wherein the sharing conditions allow the runtime representation of the class C to be shared across class loaders L1 and L2, even though the interface loaded by the loader L1 declares a different number of methods than that of the interface A loaded by the loader L2.

TABLE 1

Exemplary Runtime Representation of a Class being Shared across Loaders having Interfaces with Different Number of Methods

```
// In L1
interface A {
int foo(int i);
A foo(A);
void bar(int i);
}
// In L2
interface A {
Integer foo(Integer i);
void bar(int i);
}
// Defined by both L1 and L2
public abstract class C implements A {
int foo(int i){...}
Integer foo(Integer i){...}
A foo(A a){...}
// bar is an unimplemented method
}
```

In one embodiment of the present invention, the sharing conditions can also be used to ensure that interfaces are substantially identical across class loaders (i.e., that interfaces declare the same methods and that interfaces have identical names). In this manner, the interfaces and respective methods can occupy the same index in the table mapping methods declared by the interface to methods of the class implementing the interface. As a result, the extent of sharing between classes satisfying the sharing conditions can be increased.

Figure 1B:
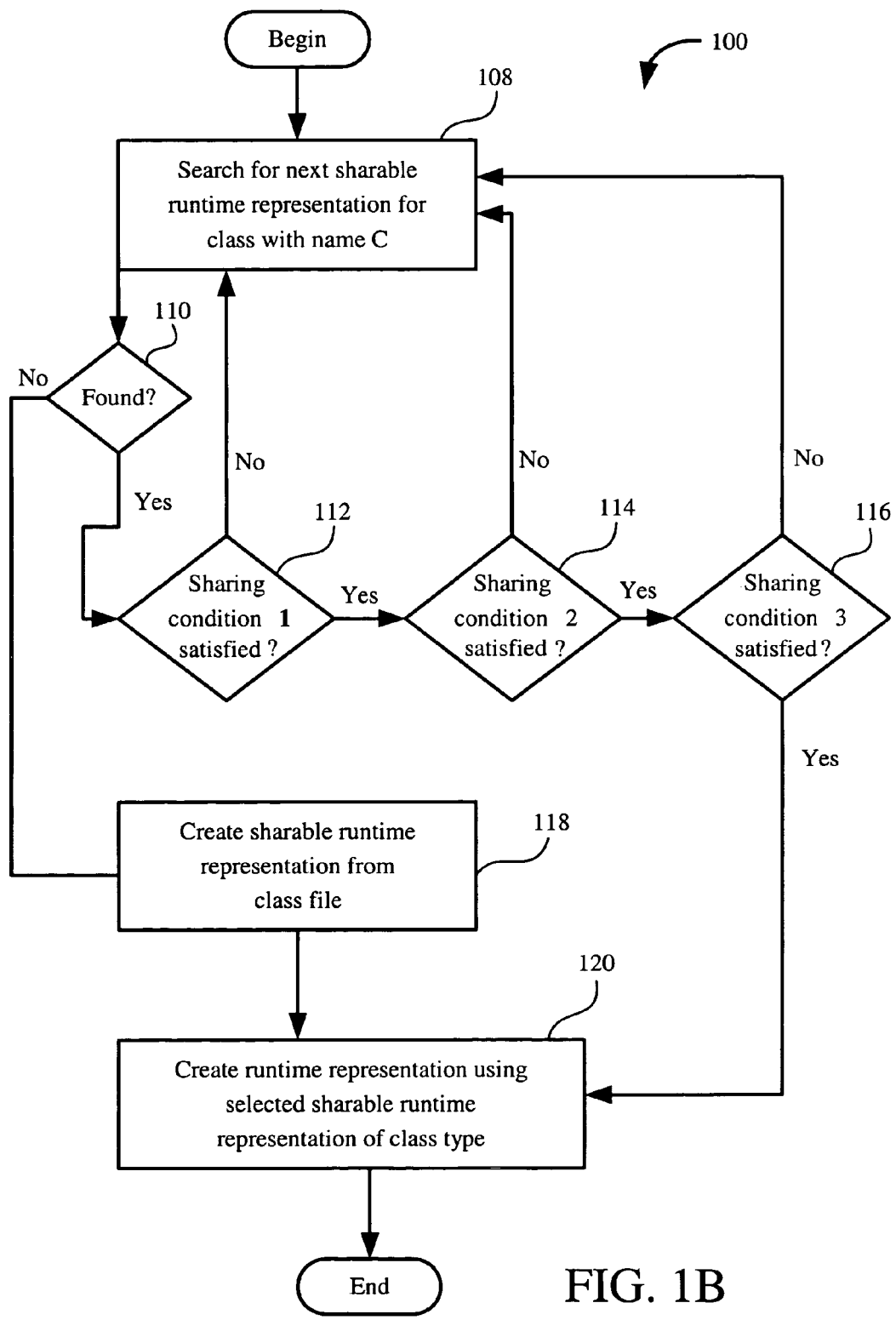
FIG. 1B shows a flowchart diagram depicting the method operations performed to determine whether the shared runtime representation (SRR) of a class type could be used to construct the runtime representation of a class type defined by a class loader, in accordance with one embodiment of the present invention.

Having discussed the manner and the extent the sharing conditions can simplify sharing of the runtime representation of classes across multiple loaders, reference is made to a flowchart diagram 100 shown in FIG. 1B depicting the method operations performed to determine whether the SRR of a class type can be used to construct the runtime representation of a class type defined by a class loader, in accordance with one embodiment of the present invention. The method begins in operation 108 in which the next SRR for the class having the class name (e.g., "C") is sought. In one example, upon receiving a request from a loader L to define a class C (i.e., to create class type <C, L>), the JVM locates all SRRs of classes with the name C. In one embodiment of the present invention, the SRRs for classes with the name C can be quickly located by looking up the SRR repository. The method then proceeds to operation 110 in which a determination is made as to whether the next SRR for the class with the name C has been found. If the next SRR for the class with the name C has not been located, the method continues to operation 118 in which a SRR is created from the class file. Next, the method continues to operation 120 in which the runtime representation of the class type is created using the selected SRR of the class type. Creating the runtime representation of the class type includes creating a loader dependent part.

However, if the next SRR for the class with the name C has been found, the method continues to operation 112 in which a determination is made as to whether the first sharing condition has been satisfied. The first sharing condition is satisfied when the same class file is used by both class loaders. If the first sharing condition has not been satisfied, the method continues to operation 108. Otherwise, the method continues to operation 114 in which a determination is made as to whether the second sharing condition has been satisfied. The second sharing condition is met when the SRR of the super class type of the class type <C, L> is the same as the SRR of the super class type of the first class type. If the second sharing condition has not been satisfied, the method proceeds to operation 108. However, if the second sharing condition has been satisfied, the method continues to operation 116 in which a determination is made as to whether the third sharing condition has been satisfied. The third sharing condition is met when the class types have the same unimplemented methods. If the third sharing condition has not been satisfied, the method continues to operation 108. Alternatively, the method continues to operation 120 in which the runtime representation is created using selected SRR of the class type with the selected SRR referring to the next SRR for the class with the class name "C."

By way of example, for each of the SRRs found, the JVM tests whether <C, L> satisfies the three sharing conditions. In one example, the order in which the sharing conditions are evaluated may be of importance. If <C, L> does not satisfy the sharing conditions with any of the SRRs, a new SRR is constructed from the class file used by L to define the class C. Otherwise, the JVM uses the first SRR with which <C, L> satisfies all the sharing conditions. Once the SRR with which <C, L> can satisfy the sharing conditions has been located, the JVM constructs a loader dependent runtime representation for <C, L> using the SRR. In one example, the JVM does not need to fully parse the class file provided by the loader L for the class C. Nor does the JVM need to construct an intermediate representation of <C, L> in order to verify whether <C, L> satisfies the sharing conditions with one of the SRRs of the class C. Additional details regarding the three sharing conditions and the manner the JVM checks whether a given class type <C, L> satisfies the sharing conditions with one of the SRRs of the class C are provided below.

Figure 2A:
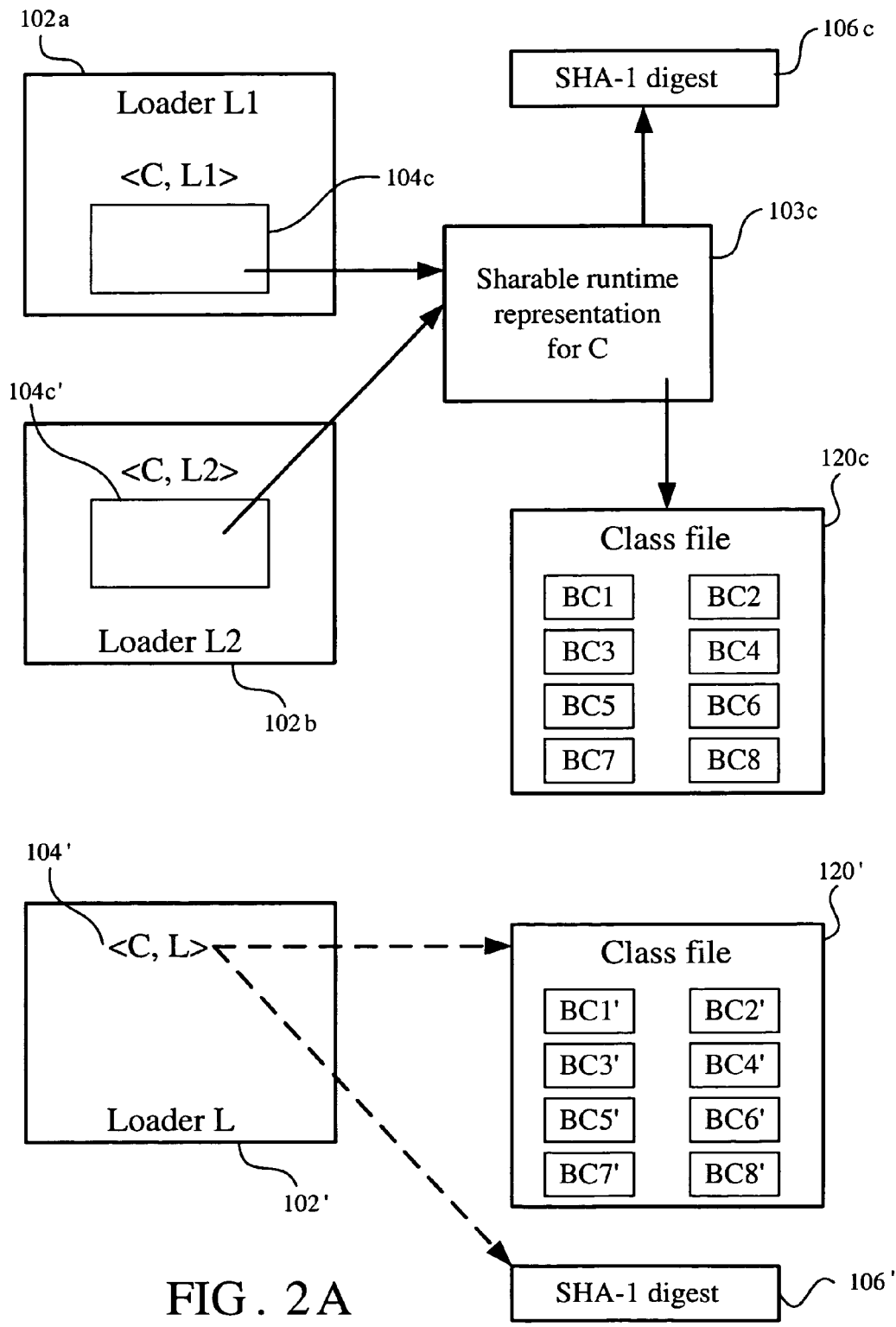
FIG. 2A shows a simplified block diagram illustrating the way the JVM can test whether the first sharing condition has been satisfied, in accordance with still another embodiment of the present invention.

In accordance with one embodiment of the present invention, the first sharing condition requires that class types whose runtime representation can share the same SRR have been defined from identical class files. The simplified block diagram shown in FIG. 2A illustrates the way the JVM can test whether the first sharing condition has been satisfied, in accordance with one embodiment of the present invention. As can be seen in FIG. 2A, a class file 120' has been submitted to the JVM by a class loader L 102' to define a class type <C, L> 104'. As shown, a class file 120c has been used to construct the SRR of class C 103c. The SRR 103c has also been used for the runtime representation 104c of class type <C, L1> and 104c' of class type <C, L2>, each defined by a loader L1 102c and a loader L2 102d, respectively. To be able to use the SRR of class C 103c for the runtime representation of class type <C, L>, the class files 120c and 120' should be identical.

In the embodiment shown in FIG. 2A, the two class files 120c and 120' are considered identical if the two class files 120c and 120' are equal byte-per-byte. In the illustrated implementation, bytes BC1-BC8 of the class file 120c are compared with bytes BC1'-BC8' of the class file 120', byte-per-byte.

In another embodiment, the JVM can use a secure Hash Algorithm-1 (SHA-1) to compute digital signatures (i.e., SHA-1 digest) of class files 120c and 120'. For instance, SRRs of classes can include the SHA-1 digest of respective class files. Thus, to search for SRRs to be used as the runtime representation of the class type <C, L> 104', the JVM computes a SHA-1 digest 106' of the class file 120' submitted by the loader L 102' for the class C. In one embodiment, testing the first sharing condition can be implemented by only comparing the digest 106' with a digest 106*c* of the SRR 103*c*. In this manner, the cost associated with byte-per-byte comparison may not be incurred. Comparing the digest 106' with the digest 106*c* can almost guarantee that the probability of two different byte streams resulting in the same digest can be very low. In another embodiment, testing the first sharing condition can further include comparing class files 120*c* and 120', byte-per-byte, when digests 106 and 106' have the same value, thus protecting against the probability of having two different byte streams having the same digest value.

The next sharing condition, the second sharing condition requires that runtime representations of class types sharing the same SRR either have the same super class type or have super class types that share the same SRR. That is, the second sharing condition requires that super (<C1, L1>)≡super (<C2, L2>), wherein super (<C, L>) denotes the super class type of the class type <C, L>. In one example, among other properties, the second sharing condition can almost guarantee that most super class types super ((C, L>) of all class types <C, L> that use the same SRR have the same SRR. By way of example, a JVM implementation can use such property by including in each SRR of a class $C\sigma_C$ the pointer to the SRR shared by all runtime representations of super classes of class C that use the $\cong_C$. Thus, the SRR pointed to by the SRR $\sigma_C$ is hereinafter referred to as the super SRR of SRR $\sigma_C$.

In one example, when using software components, the second sharing condition compares the loader independent part of the runtime representation of component types that are super-type of the first and second software component types, respectively. The second condition is satisfied when loader independent parts of the runtime representation of first and second software component types that are the super-type of first and second component types are equal, respectively.

Figure 2B:
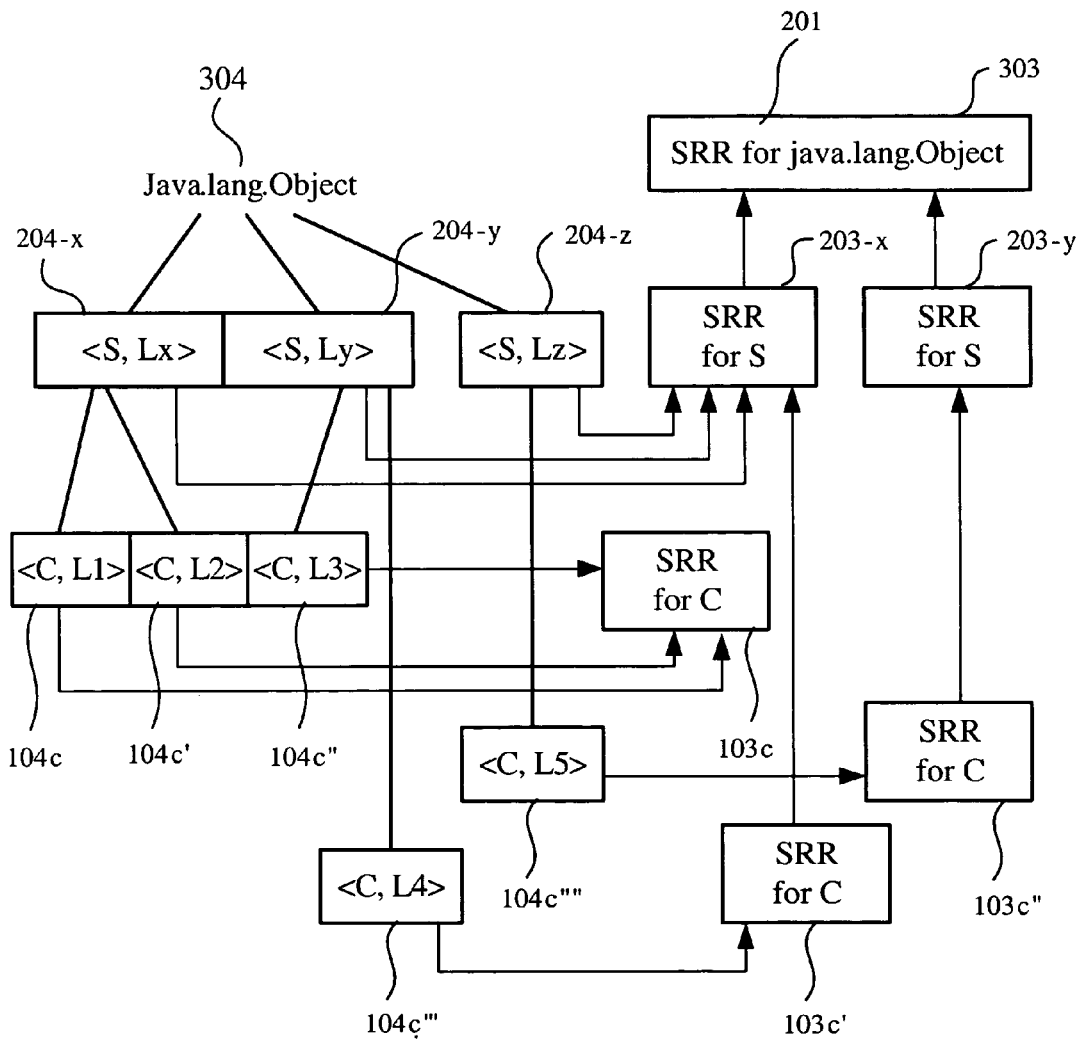
FIG. 2B shows a simplified block diagram illustrating an exemplary hierarchy of classes loaded by a software program, in accordance with yet another embodiment of the present invention.

Continuing to FIG. 2B, an exemplary hierarchy of classes loaded by a software program is illustrated, according to one embodiment of the present invention. Class types <C, L1> 104*c*, <C, L2> 104*c'*, and <C, L3> 104*c"* are shown to share the same SRR for the class C 103*c*. As illustrated, <C, L1> 104*c* and <C, L2> 104*c'* have the same super class type <S, Lx> 204-*x*, whereas the super class type for <C, L3> 104*c"* is <S, Ly> 204-*y*. Both <S, Lx> 204-*x* and <S, Ly> 204-*y* use the same SRR for S 203-*x* (i.e., <S, Lx>~<S, Ly>), thus satisfying the second sharing condition. However, although the class type <C, L4> 104*c'"* has the super class type <S, Ly> 204-*y* and therefore satisfies the second sharing condition with <C, L1> 104*c*, <C, L2> 104*c'* and <C, L3> 104*c"*, the class type <C, L4> 104*c'"* uses a different SRR for the class C (i.e., 103*c'*). In one example, while necessary, merely satisfying the second sharing condition may not be sufficient to use a SRR. For instance, although the class type <C, L4> has satisfied the second sharing condition, <C, L4> may violate the first sharing condition or the third sharing condition, or both first and third sharing conditions.

As can be seen in the embodiment illustrated in FIG. 2B, every SRR 103*x*-103*c"* includes a pointer to the respective super SRR 203-*x* and 203-*y*. That is, every SRR 103*x*-103*c"* includes a pointer to the unique SRR used by each super class type of class types that use the first SRR. For example, the SRR for class C 103*c* includes a pointer to the SRR for S 203-*x*. In this manner, the second sharing condition can almost guarantee that substantially all class types that use the SRR for the class C 106*c* can have a super class type which uses the SRR for S 203-*x*. Similarly, the SRR for C 103*c'* includes a pointer to the SRR for S 203-*x*, and SRR for C 103*c"* includes a pointer to the SRR for S 203-*y*.

Evaluating whether the class type <C, L> 104' satisfies the second sharing condition with an existing SRR, can be achieved by comparing the pointer to the SRR of the super class type 207 of class type <C, L> 104*b* with the pointer to the super SRR of the SRR being considered for sharing. For example, assume that the JVM is testing whether class type <C, L> 104' satisfies the second sharing condition with the SRR for C 103*c"*. The JVM finds the super class type of <C, L> 104' by looking up in the database of the loaded classes having the class name S (i.e., the super class name specified in the class file for <C, L>) as well as the initiating loader L 102'. By way of example, the result can be <S, Lx> (i.e., $S^L$=<S, Lx>). In such a scenario, the JVM then tests whether the pointer to the SRR used by <S, Lx> 204-*x* (i.e., the SRR for S 203-*x*) is equivalent to the pointer to the super SRR of the SRR for class C 103*c"*, which in this example is SRR for S 203-*y*. As can be seen, in the illustrated embodiment, the pointers are different, and therefore, the second sharing condition has not been satisfied. Accordingly, the SRR for C 103*c"* cannot be used for <C, L> 104'. In the illustrated embodiment, next, the JVM moves on to test the second sharing condition with the remaining SRRs for C, if one exists. In the illustrated embodiment, eventually, the JVM can find that the SRR for C 103*c'* satisfies the second condition (the super SRR of SRR for C 103*c'* is SRR for S 203-*x*, which is also the SRR used by the super class type of class type <C, L>.

Next, satisfying the third sharing condition requires that almost all class types using the same SRR to have the same number of abstract methods. Abstract methods that have been declared by a class, however, do not have any implementation. In one example, abstract methods can be overridden by sub-classes of a class. In the Java programming language, abstract methods can either be declared explicitly or implicitly. For instance, an abstract method can be declared explicitly by the programmer, who specifies the abstract modifier when declaring the abstract method. Alternatively, the abstract method can be declared implicitly, when methods are inherited from an interface that has been declared by a class, or one of the super classes of the class that have not been implemented by the class or any of the super classes of the class. In one example, classes with at least one abstract method are declared abstract using the abstract modifier. Class files of the abstract class include an attribute characterizing the class as an abstract class.

It must be appreciated that because the first and second sharing conditions have already been satisfied, in one example, a number of conditions associated with the abstract methods may have been satisfied by the time the third sharing condition is being tested. For instance, having satisfied the first sharing condition implies that <C, L> is defined from a class file that is equivalent to the class file used to construct $\sigma_C$. Therefore, the class file from which <C, L> is defined as well as the class file used to construct $\sigma_C$ declare the same abstract methods explicitly (including the scenario wherein the class file from which <C, L> is defined as well as the class file used to construct $\sigma_C$ do not declare any abstract methods, explicitly).

The second sharing condition assures that the SRR used by super (<C, L>) is the same as the super SRR of $\sigma_C$. In this manner, the three sharing conditions have been satisfied and consequently, the abstract methods are the same. The combination of the first and second sharing combinations means that in order for <C, L> and $\sigma_C$ to have different abstract methods, <C, L> should declare at least one interface I, and <C, L> cannot implement at least one method that has been declared by the interface I. Alternatively, the combination of the first and second sharing conditions means that if neither <C, L> nor any of super classes of <C, L> declare a non-empty interface, then <C, L> and $\sigma_C$ have the same abstract methods. As will be explained in more detail below, an implementation of the JVM can be used to accelerate testing of the third sharing condition, in accordance with one embodiment of the present invention.

Figure 3:
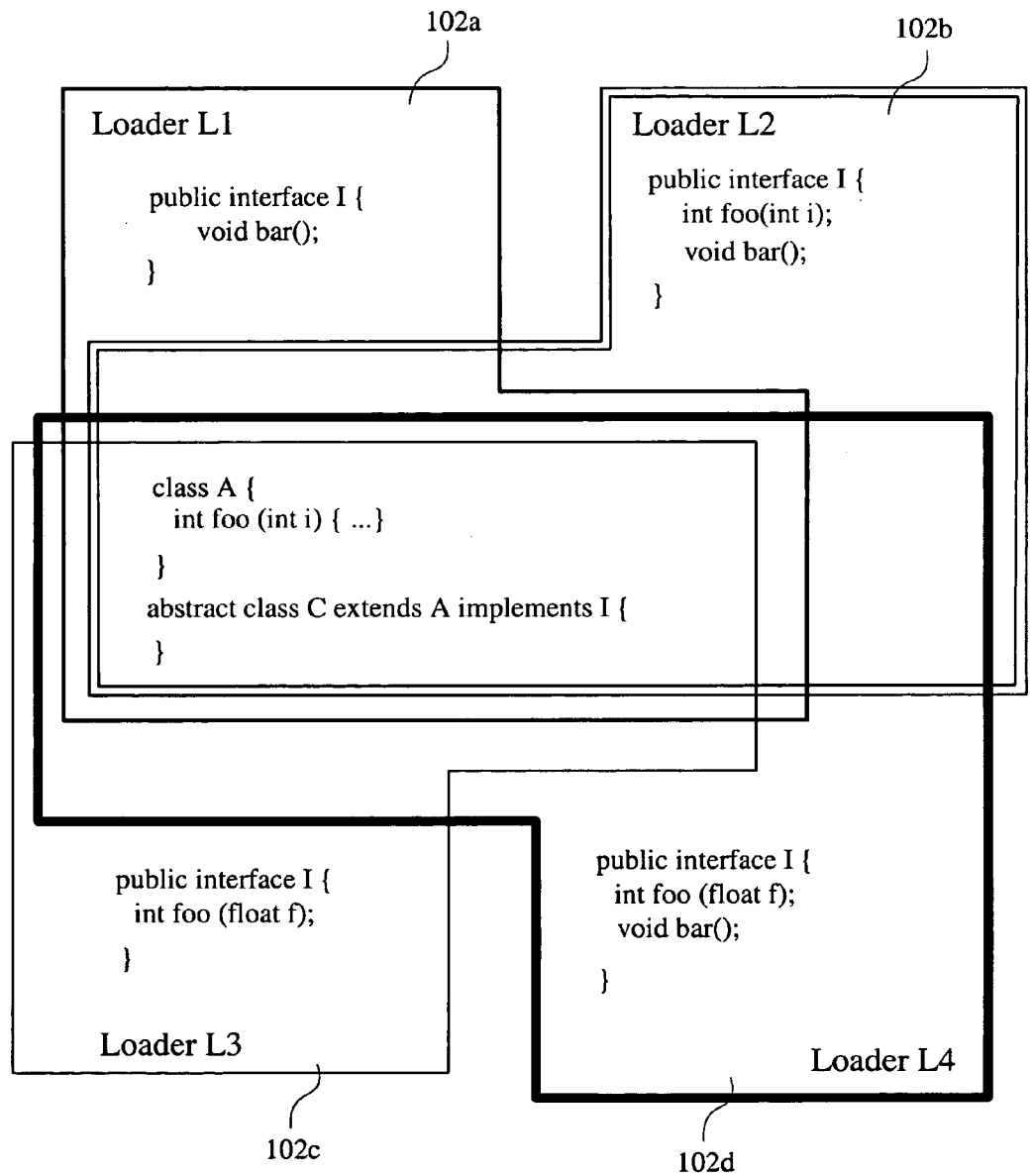
FIG. 3 shows a simplified block diagram illustrating when the third sharing condition is satisfied using an example of four class loaders each defining the same class, in accordance with still another embodiment of the present invention.

Reference is made to a simplified block diagram shown in FIG. 3 depicting a scenario wherein four loaders L1, L2, L3 and L4 102a-102d define the same classes A and C, wherein the class C extends the class A, and the class C implements an interface I. In the illustrated embodiment, the class C is an abstract class, as the class C does not implement all methods defined in the interface I. In one example, each of the loaders L1-L4 102a-d can define a different version of I. In this manner, the JVM needs one SRR for the class A that can be shared across the four loaders L1-L4 102a-d since L1-L4 102a-d satisfy the same three sharing conditions (i.e., <A, L1>~<A, L2>~<A, L3>~<A, L4>).

Furthermore, the four loaders L1-L4 102a-d satisfy the first two sharing conditions for the class C. Additionally, <C, L1> and <C, L2> can use the same SRR for class C as <C, L1> and <C, L2> satisfy the third sharing condition: Although <C, L1> and <C, L2> define different versions of the interface I, <C, L1> and <C, L2> each has a single unimplemented method, and each has the same name and signature (i.e., method void bar( )). <C, L1> and <C, L2> therefore satisfy the three sharing conditions and can use the same SRR. However, although <C, L3> has a single unimplemented method (void foo(float f)) similar to <C, L1> and <C, L2>, the method does not have the same name and type. In a like manner, <C, L4> has two unimplemented methods (i.e., bar and foo(float f)) and as such, does not satisfy the third sharing condition with any of the SRRs for the class C. Consequently, the JVM needs to create respective SRRs for each of the class types <C, L3> and <C, L4>.

An exemplary algorithm for determining whether the third sharing condition has been satisfied so as to use the SRR $\sigma_C$ for the runtime representation of the class type <C, L> can be described as follows: In one embodiment, the JVM searches the runtime representation of each of the interfaces declared by <C, L>. For each interface $I^L$, the JVM determines which of the methods of $I^L$ does not have an implementation in the SRR $\sigma_C$. In one example, such determination is made by searching for a method having the same name and signature in the SRR $\sigma_C$. In such a scenario, the third sharing condition is satisfied if the following two criteria have been fulfilled. First, for each unimplemented method of each interface of the class file <C, L> a corresponding method having the same name and signature should exist in the list of unimplemented methods of the SRR $\sigma_C$. Second, the number of unimplemented methods of SRR $\sigma_C$ should be equivalent to the number of unimplemented methods of interfaces of <C, L>.

In one embodiment of the present invention, testing for the third sharing condition can be expedited by testing, first, whether the SRR $\sigma_C$ declares any non-empty local interfaces. If the SRR $\sigma_C$ does not declare any non-empty local interfaces, the third sharing condition is satisfied. At this point, the JVM can use the SRR to build the runtime representation of <C, L>. Otherwise, the JVM can use the above described algorithm.

In another embodiment of the present invention, determining whether the third sharing condition has been satisfied can be expedited by maintaining an array of pointers to each of the SRRs for the class C and for each of the interfaces I declared by the class C. In such a scenario, the JVM can avoid performing the basic algorithm for testing the third sharing condition if the SRR $\sigma_1$ used for the runtime representation of each interface $I^L$ declared by <C, L> is equal to the SRR for interface I defined in the array of pointers of the SRR $\sigma_C$.

Figure 4A:
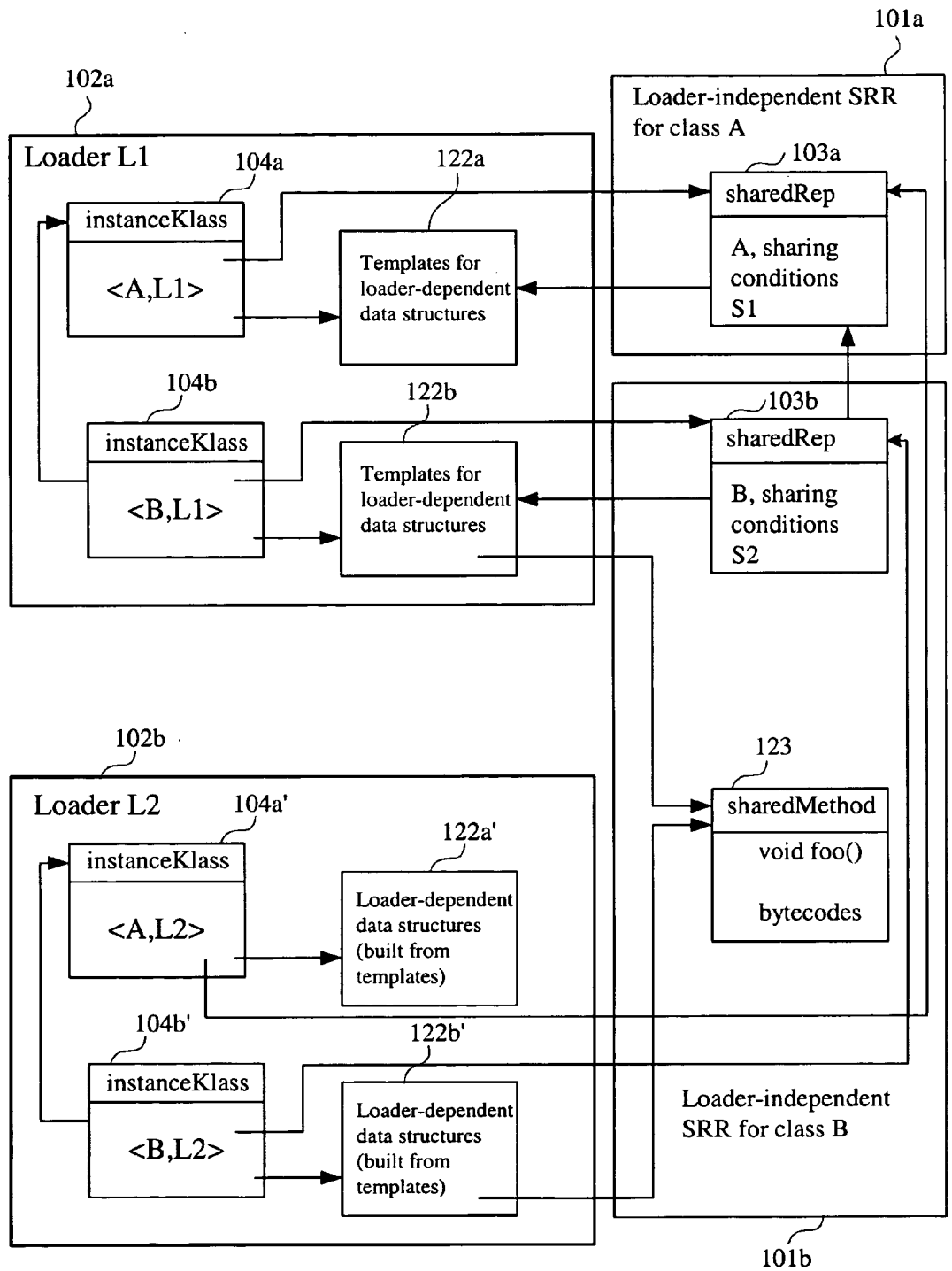
FIG. 4A is a simplified block diagram of a portion of the runtime representation of two classes being shared in an exemplary implementation of the JVM of the present invention, in accordance with yet another embodiment of the invention.

Keeping in mind the descriptions of the three sharing conditions, reference is made to a high level block diagram shown in FIG. 4A depicting a portion of the runtime representation of classes A and B being shared in an exemplary implementation of the JVM of the present invention, in accordance with one embodiment of the present invention. As will be explained in more detail below, in one embodiment, the runtime representation of a class is configured to mirror an architecturally-neutral binary representation of the class with a format optimized for main-memory use by various subsystems of the JVM. In one aspect, exemplary subsystems can be the bytecode interpreter, the dynamic compiler, the garbage collector, etc.

In the embodiment shown in FIG. 4A, the class loader L1 102a and the class loader L2 102b both have defined classes A and B, such that the class B extends class A. In the illustrated embodiment, extending of the class A by the class B results in the creation of class types <A, L1> 104a, <A, L2> 104a', <B, L1> 104b, <B, L2> 104b' such that <A, L1>~<A, L2>, and <B, L1>~<B, L2> (i.e., L1 and L2 satisfy the same sharing conditions, respectively, for classes A and B). As can be seen, the runtime representation of each class type includes a loader dependent portion implemented by a corresponding instanceKlass object 104a, 104a', 104b, and 104b' and a respective loader independent SRR implemented by a corresponding sharedRep object 103a and 103b. Since loaders L1 102a and L2 102b can share the runtime representation of classes A and B, the instanceKlass 104a for the class type <A, L1> and the instanceKlass 104a' for the class type <A, L2> refer to the same sharedRep 103a implementing a SRR for the class A.

Similarly, the instanceKlass 104b for the class type <B, L1> and instanceKlass 104b' for class type <B, L2> refer to the same sharedRep 103b implementing a SRR for the class B. As illustrated, in accordance to one embodiment of the present invention, the sharedRep 103a includes a reference to the sharedRep 103b to implement the super type relationship between SRR, for implementing the second sharing condition. As can be appreciated, a hierarchy exists between the sharedRep objects 103a and 103b that corresponds to the hierarchy defined between the classes A and B. In the illustrated embodiment, the runtime representations of classes A and B include corresponding references to the runtime representation of respective super classes, as illustrated by references from instanceKlass object 104b and instanceKlass object 104b' to instanceKlass object 104a and instanceKlass object 104a', respectively.

In one example, the SRR for a class can include a template for loader dependent data structures. In this manner, the template can be used at class load time to build the loader dependent runtime representation of class types that satisfy the sharing conditions to use the SRR including the template. In one aspect, the template can be used as part of the loader dependent runtime representation of one of the class types that use the SRR so as to minimize space overhead. For example, as illustrated in the embodiment of FIG. 4A, templates 122a and 122b) referenced by sharedReps 103a and 103b, correspondingly, are used as part of the runtime representation for the class type <A, L1> and <B, L1> implemented by instanceKlass objects 104a and 104b, respectively. In the illustrated embodiment, templates 122a and 122b have been used to built the loader dependent data structures 122a' and 122b', respectively, for corresponding class types <A, L2> and <B, L2>. If the class type <A, L1> is unloaded (e.g., following a garbage collection operation, etc.), the loader dependent data structures of another class type can be used by the SRR of class A 103*a* as a template, for instance, the loader dependent data structures 122′*a* of the class type <A, L2>.

According to one embodiment of the present invention, the SRR for a class can also include SRRs of methods of the class. By way of example, the SRR of a method, as implemented by a sharedMethod object 123 in one exemplary JVM, includes most of the runtime representation of the method. In one example, the sharedMethod object 123 includes the byte-codes of the method. In another example, the sharedRep object 103*b* includes the sharedMethod object 123 which encapsulates, among other information, the bytecode of the method foo. The sharedMethod object 123, for instance, can be accessed by the sharedRep object through loader dependent data structures 122*b* and 122*b*′. According to one embodiment, instances of a class can contain pointers in respective headers with each pointer being directed to the instanceKlass object representing the corresponding class. For example, instances of the class type <A, L1> can include a pointer to the instanceKlass object 104*a*, in respective headers.

Figure 4B:
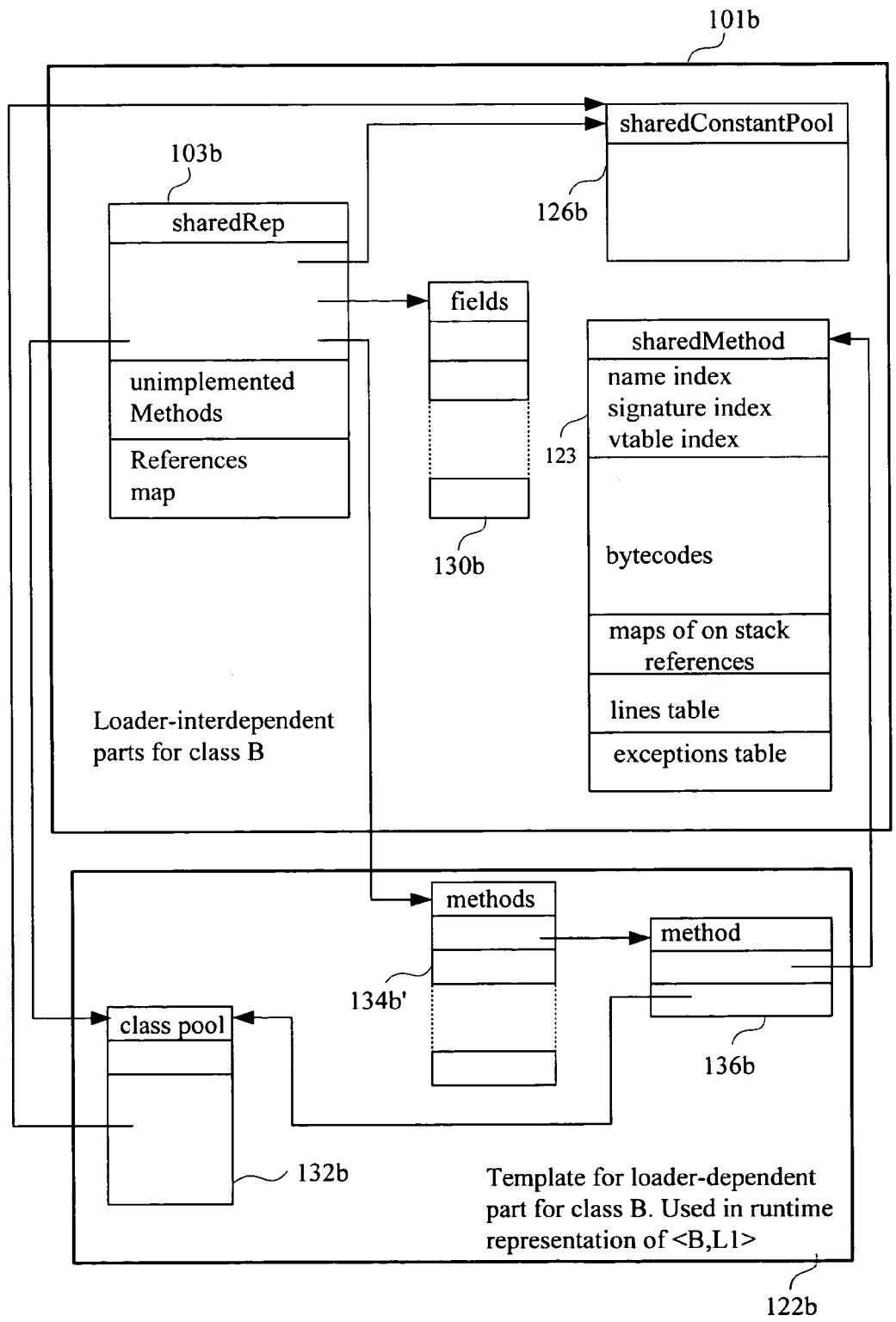
FIG. 4B is a simplified block diagram showing certain components of the loader independent SRR of the runtime representation of a class type and the loader dependent part of the same runtime representation of the class type, in accordance with yet another embodiment of the invention.

Proceeding to FIG. 4B, a detailed block diagram showing certain components of the loader independent SRR 101*b* of the runtime representation of the class type <B, L1> and the loader dependent part 122*b* of the same runtime representation of the class type <B, L1> is provided, in accordance with one embodiment of the present invention. In one example, the loader dependent part 122*b* of the runtime representation of the class type <B, L1> can be used as a template for building the loader dependent part of the runtime representation of other classes capable of using the SRR 101*b* for runtime representation (e.g., the loader dependent part 122*b*′ of class <B, L2>).

As can be seen, the loader dependent part 122*b* of the runtime representation of class type <B, L1> includes a class pool data structure 132*b*, a constant pool cache data structure (not shown in this Figure), and an array 134*b* of pointers to loader dependent representations of methods. Each loader dependent representation of a method can be implemented with a method object (e.g., a method object 136*b*).

The loader independent part 101*b* for the class type <B, L1> includes most of the runtime representation of the class B, such as the sharedRep object 103*b*. In turn, the sharedRep object includes a reference map 128*b*, references to the array of fields 130*b* declared by the class B, the shared constant pool 126*b*, and the sharedMethod object 123 for each of the methods defined by the class B. In one example, the reference map 128*b* can be used to assist the garbage collector to find references in instances of the class B. The sharedRep object 103*b* can also include a reference (not shown in this drawing) to the super sharedRep object of the SRR of the super classes of all classes having the SRR 101*b* for the shared runtime representation. The sharedRep object 103*b* can also include references to loader dependent data structures, such as, the class pool 132*b* and the array of methods 134*b*.

References to the loader dependent data structures can help minimizing the space consumed by the SRR. By way of example, the loader dependent data structures enable access to the sharedMethods objects 123 via the arrays of loader dependent method objects 136*b*, thus evading the use of an array of sharedMethod objects. Similarly, the loader dependent data structures avoid replicating entries for classes defined in the shared constant pool objects by retrieving the loader dependent data structures from the loader dependent class pool 132*b*. Additionally, the loader dependent data structures 122*b* can be used as templates for building the loader dependent part of the runtime representation of the class capable of using the loader independent SRR.

With continued reference to FIG. 4B, as illustrated, each method 136*b* includes a reference to the shared method object 123, the class pool 132*b*, and a class-loader re-entrant compiled code 142 (not shown in FIG. 4B), if one has been produced by the dynamic compiler. The sharedMethod object 123, in turn, includes most of the definition of a method. For instance, the sharedMethod object 123 includes the name index, the signature index, and vtable index of the method, the method bytecodes, method maps of on stack references for garbage collection, lines table, exception table, etc. In another embodiment, the sharedMethod object 123 can further include data encoding the protection level of the method as well as information related to the native code of the method that may have been produced by the dynamic compiler.

In contrast, the loader dependent representation 136*b* of the same method object includes a pointer to the loader dependent class pool 132*b* of the instanceKlass owning the method 136*b* and a pointer to the sharedMethod object 123 for that method. In one example, a pointer to the compiled code which may have been produced by the dynamic compiler for the method may be stored in the method object 136*b*.

In one exemplary embodiment, the instanceKlass object 104*b* includes storage for the static variables of the class B, the virtual method table (vtable), and the interface table (itable). Further included in the loader dependent part 122*b* are references to some general information about the class <B, L1>. For instance, a reference to the instanceKlass object of class <A, L1> 104*a* can include references to instances of java.lang.Class, java.lang.ClassLoader, and a reference to the sharedRep object 103*b* from which all data structures forming the loader independent SRR for <B, L1> 101*b* can be reached.

As can be appreciated, in one embodiment, by using the sharing conditions it can be ensured ensure that the vtable index is the same across class loaders. The sharing conditions can further assure that methods are inherited and overridden in the same manner across class loaders. In one example, entries of the vtable can be configured to refer to the class loader dependent representation of methods.

In one exemplary embodiment, the shared constant pool 126*b*, the class pool 132*b*, and the constant pool cache of the runtime representation of a class can be constructed based on information extracted from the constant pool of the class file containing the architecturally-neutral binary representation of the class. In one instance, the constant pool can include all the symbolic links to the variables, methods, interfaces, constants, and classes referenced by the bytecodes of the methods of the class. The constant pool can further include a table, which contains one or more indices to other entries of the table, or an offset within the class file where a symbol is stored. Bytecode instructions capable of using symbolic links (e.g., bytecode instruction used to invoke a method or access a variable, etc.) can include an index to an entry of the constant pool describing the symbolic link required for the bytecode.

Figure 5:
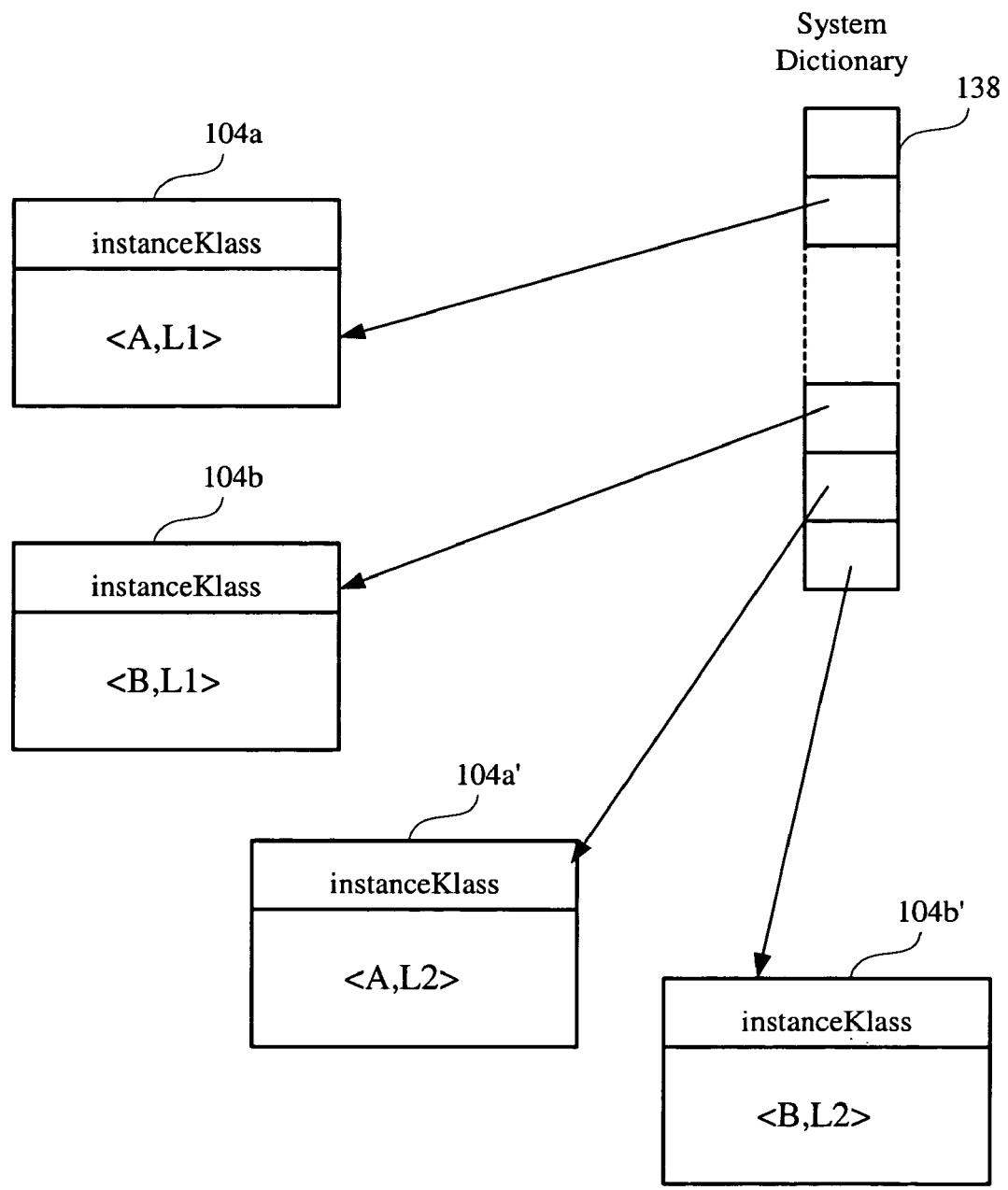
FIG. 5 is a block diagram illustrating an exemplary system dictionary used by an exemplary implementation of the JVM to keep track of the runtime representation of classes loaded, in accordance with still another embodiment of the invention.

The block diagram shown in FIG. 5 depicts an exemplary system dictionary used by an exemplary implementation of the JVM to keep track of the runtime representation of classes loaded, in accordance with one embodiment of the present invention. As can be seen, the runtime representation of class types <A, L1>, <A, L2>, <B, L1>, and <B, L2> are recorded in a system dictionary 138. In one example, the system dictionary 138 maps keys that include a fully qualified class name and class loader reference to the respective instanceKlass objects 104*a*, 104*b*, 104*a*′, and 104*b*′. According to one example, multiple entries of the system dictionary 138 can refer to the same instanceKlass object as a result of delegation between class loaders.

Figure 6:
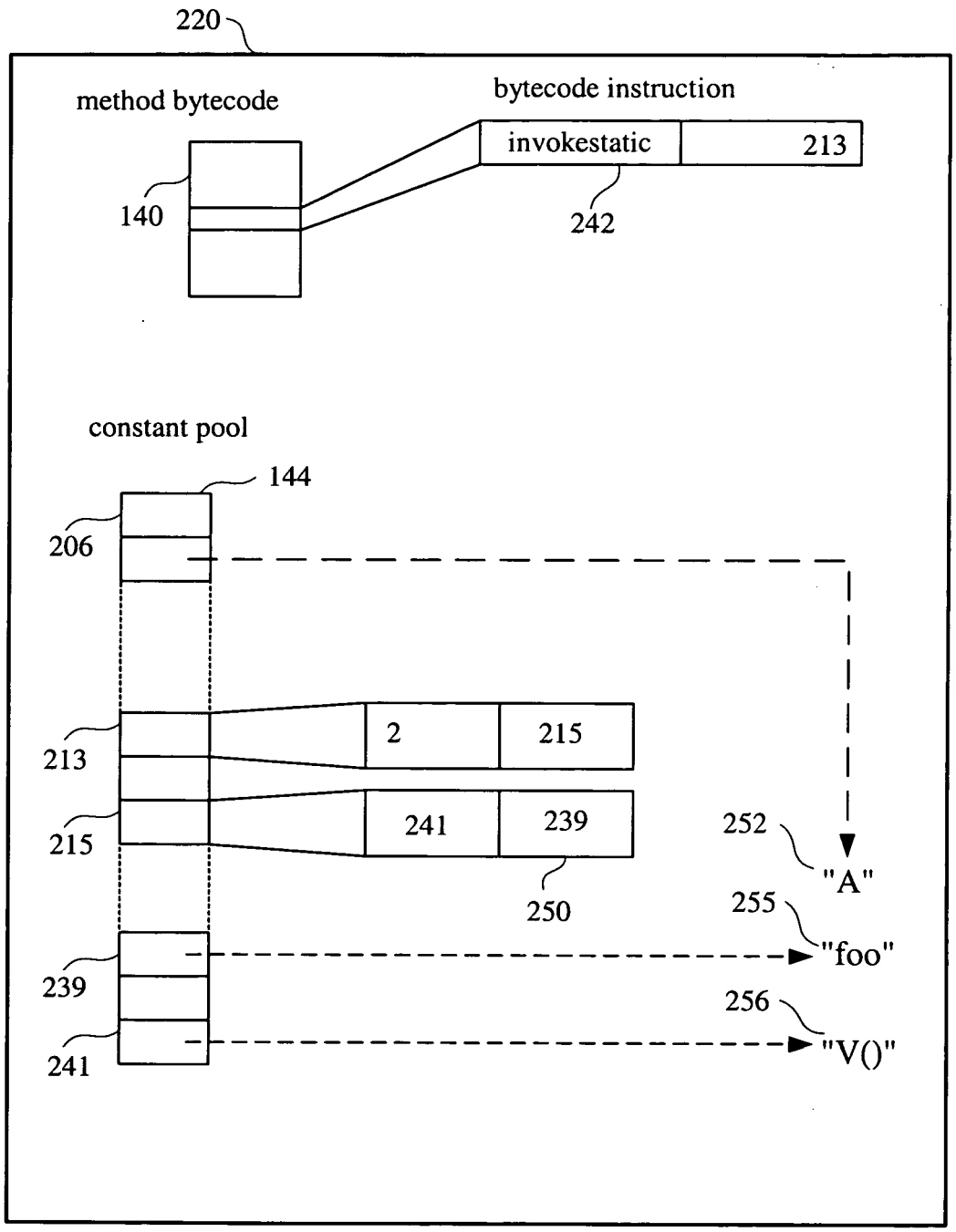
FIG. 6 is a block diagram illustrating the relationships between a constant pool, bytecodes, and symbols used to encode a symbolic link in an exemplary class, in accordance with yet another embodiment of the invention.

Referring to the block diagram shown in FIG. 6, the relationships between a constant pool 144, bytecodes, and symbols used to encode a symbolic link in an exemplary illustration of the class file 220 can be understood, in accordance with one embodiment of the present invention. A Bytecode instruction 242 of the method bytecode stream 140 includes an index 213 to the entry 248 of the constant pool 144 which describes the symbolic link used by instruction 242. The entry 248 of the constant pool 144 in turn references two additional entries of the constant pool 144, entries 2 and 215. As can be seen, the entry 2 contains an offset to the symbol 252 that encodes the name of the class "A," and the entry 215 that contains indices to two other entries 241 and 239 of the constant pool 144. As shown, the entry 241 contains an offset to the method name 255 "foo" while entry 241 includes an offset to the signature 256.

According to one embodiment, to execute a bytecode instruction, the symbolic links required for the execution of the bytecode are configured to be translated into corresponding addresses in the main-memory where the corresponding items (e.g., variable, method, etc.) reside. In one example, the translation from symbolic link to an address in the main-memory is herein referred to as "link resolution." Resolving of a symbolic link may result in loading the referenced class if the reference class has not been loaded yet. Symbolic link resolution can be expensive as symbolic link resolution can include locating a class loaded by the current class loader and searching the current class loader runtime representation for the object named by the symbol.

In one example, to avoid the cost of symbolic link resolution every time a bytecode instruction uses the symbolic link, the value of the resolved link can be saved once the link has been resolved for the first time. In such a scenario, an implementation of the JVM can save the resolved link in a runtime representation of the constant pool, at the entry previously indexed by the bytecode instructions. However, saving the resolved link in a runtime representation of the constant pool can cause the constant pool 144 to depend on the class loader resolving the link. The present invention can avoid such problem and allow a part of the constant pool information to be shared across multiple loaders. In one embodiment, sharing a part of the constant pool information across multiple loaders can be achieved by dividing the constant pool 144 into a loader independent part and a loader dependent part. In one example, the loader independent part is a shared constant pool, and the loader dependent part comprises a class pool and a constant pool cache.

Figure 7A:
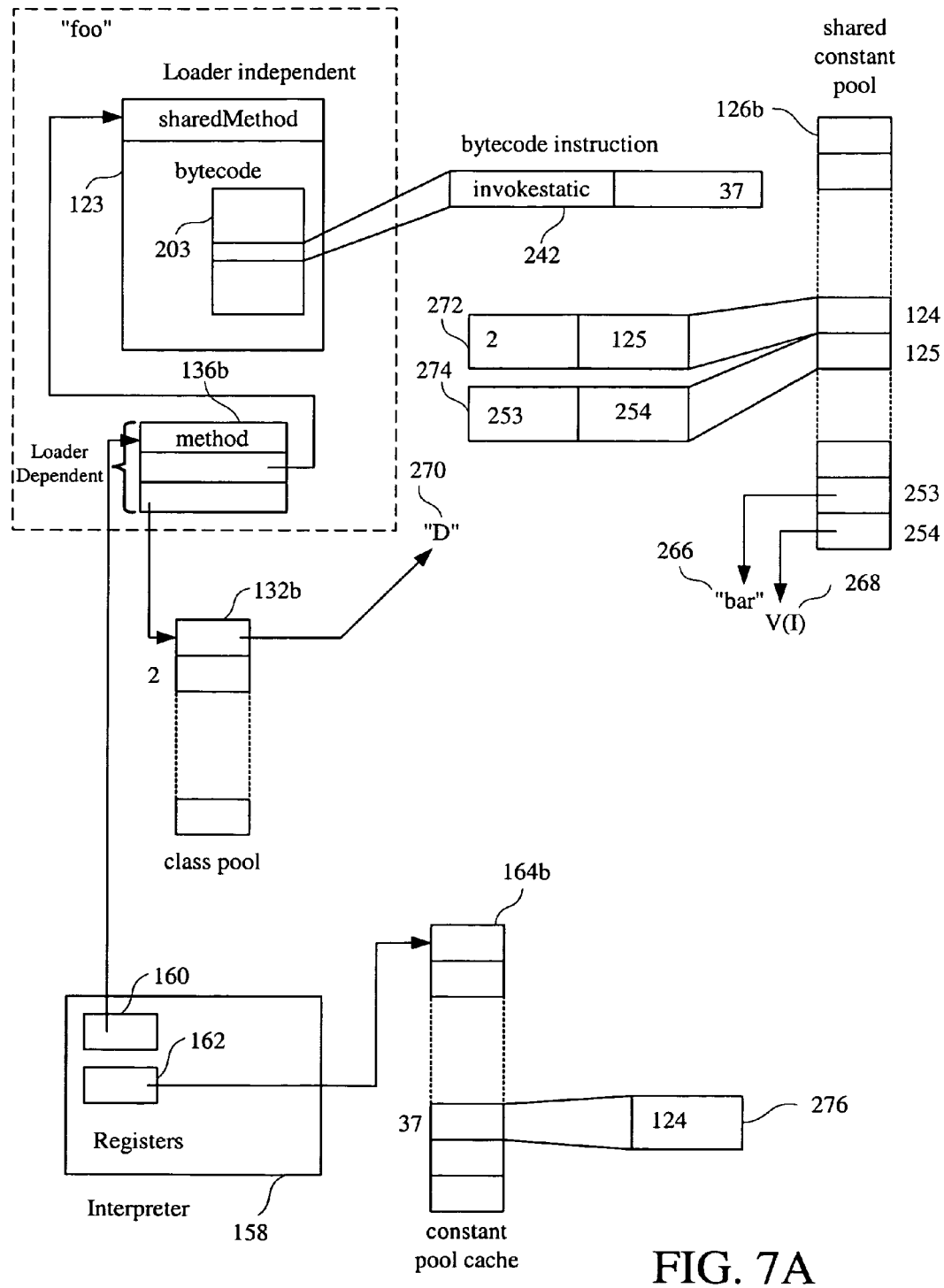
FIG. 7A is a block diagram depicting the components of an exemplary runtime representation of a class type involved in a link resolution performed by an interpreter, in accordance with still another embodiment of the present invention.

Reference is made to the block diagram shown in FIG. 7A depicting the components of an exemplary runtime representation of the class type <B, L1> involved in a link resolution performed by an interpreter 158, in accordance with one embodiment of the present invention. As depicted, the shared constant pool 126b contains symbolic information configured to be constant across all the class loaders sharing the symbolic information. In one instance, such exemplary information may include indices to entries of the shared constant pool 126b, indices to entries of the class pool 116b, pointers to symbol objects, constant numerical values, pointers to objects implementing literal strings, etc. In one example, the class pool 132b contains symbolic links to classes.

The symbolic links to classes can be in an unresolved form (e.g., an index to an entry of the shared constant pool 126b containing a pointer to a symbol object), or in a resolved form (e.g., as a pointer to instanceKlass object). The constant pool cache 164b is configured to contain almost all the symbolic links to methods and variables of classes, and methods of interfaces. Unresolved entries of the constant pool cache 164b can contain an index to an entry of the shared constant pool 126b holding the corresponding unresolved symbolic link. In one embodiment of the present invention, resolved entries of the constant pool cache 164b can contain information obtained from the resolved link. In this manner, bytecode interpretation (e.g., the address of a static variable, the vtable index of a virtual method, the address of a method object, or the offset of an instance variable within respective holder, etc.) can be performed faster. However, it should be appreciated by one of ordinary skill in the art that other arrangements can be implemented, so long as loader dependent and loader independent parts are disjoint, and the loader independent part only contains data that is constant across the loaders sharing the data.

In one example, bytecodes of the class file 220 can refer to a symbolic link via indices to the constant pool 144 of the class file 220. In such a scenario, the main-memory copy of the bytecodes encapsulated in shared method objects can refer to symbolic link via indices of either the constant pool cache 164b or the class pool 132b. In one example, the bytecode instructions including indices to the constant pool 144 of the class file 220 can be rewritten to include indices to corresponding entries of the constant pool cache 164b and class pool 132b. In one embodiment, such bytecode rewriting can take place, for example, at class link time, just after verification of the bytecodes by the verifier of the JVM. It must be noted, however, that bytecode rewriting can be performed at any appropriate time, so long as bytecode rewriting is performed before the bytecodes are executed.

Still referring to FIG. 7A, the interpreter 158 is shown to keep track of the method being executed as well as the constant pool cache 164b of the class that defines the method in machine registers 160 and 162, respectively. In the embodiment shown in FIG. 7A, the current method is method "foo" of class <B, L1> with the loader dependent part of the runtime representation of foo being the method object 136b, and the shared method object 123 being the loader independent part of the runtime representation. Consequently, machine register 160 holds the pointer to the loader dependent representation 136b of method foo, while machine register 162 holds the constant pool cache 164b. As shown, the interpreter 158 is currently executing bytecode instruction 242 of the bytecodes 203 of method foo encapsulated in sharedMethod object 123 of the loader independent part of the runtime representation of class <B, L1>. The bytecode instruction 242 includes an index to entry 276 of the current constant pool cache, in this case, constant pool cache 164b. The entry of the constant pool cache 164b referenced by bytecode instruction 242 is not resolved and contains an index to an entry 272 of the shared constant pool 126b. The entry 372 in turn contains an index to an entry 274 of the shared constant pool 126b, and an index to an entry of the class pool 132b that contains a pointer to symbol 270 encoding the name of the class D. Entry 274 of the shared constant pool 126b in turn contains two indices to entries of the shared constant pool 126b that contain pointers to symbols 266 and 268 encoding a method name and a method signature, respectively. One must appreciate that all information in the shared constant pool 126b and bytecodes 203 is loader independent. That is, indices stored in the data structures are valid across all class loaders that share the runtime representation of class B.

Figure 7B:
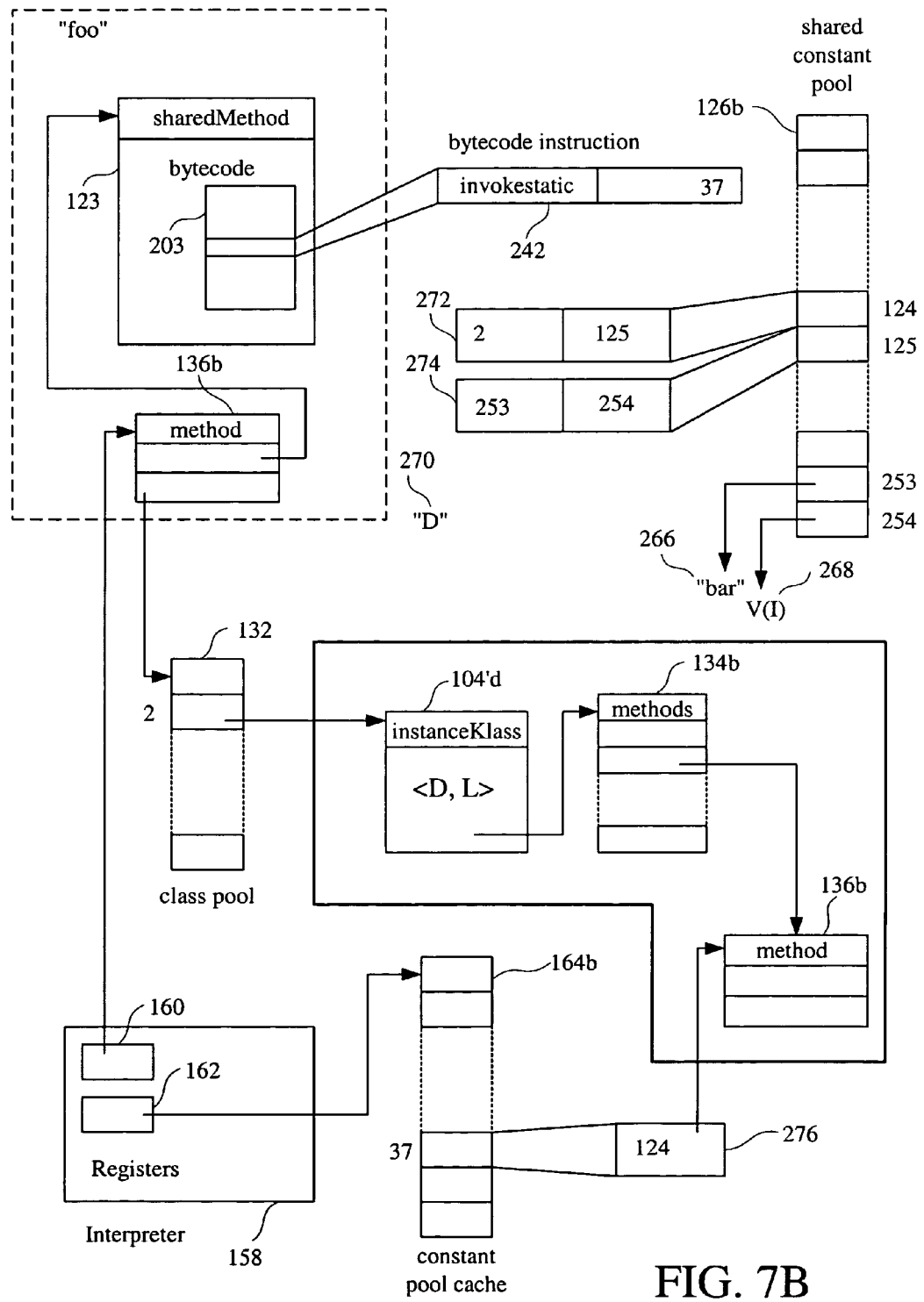
FIG. 7B depicts a block diagram illustrating components of the runtime representation of a class type subsequent to resolution of the symbolic link required by the bytecode instruction, in accordance with still another embodiment of the present invention.

FIG. 7B depicts a block diagram illustrating components of the runtime representation of the class type <B, L1> subsequent to resolution of the symbolic link required by the bytecode instruction 242, in accordance with one embodiment of the present invention. As a result of link resolution, the entry of the class pool that included a pointer to the symbol 270 has been overwritten with the pointer to the instanceKlass object 104'd, as the link was resolved. Furthermore, the entry 276 of the constant pool cache 164b has been updated to contain a pointer to the method object 136b. Subsequent execution of bytecode instructions referring to the entry 276 of the constant pool cache 164b of the class type <B, L1> can avoid the cost of link resolution and use the pointer to method 136b' directly which is available from the constant pool cache entry 276. One must appreciate that in this embodiment, the link resolution has updated loader dependent data structures (e.g., the class pool 132b and constant pool cache 164b).

According to one embodiment, an implementation of the JVM resolves a symbolic link by locating the class referenced by the symbolic link. If the class referenced by the symbolic link cannot be located, the JVM issues a request to the current class loader to load the missing class. The loader that eventually defines the class then passes the class file for the class to the JVM, which builds a runtime representation of the class. As was described in more detail with respect to FIG. 5, the system dictionary and the shared class repository can be used by the JVM to locate runtime representation of classes and SRR of classes, respectively.

Figure 8A:
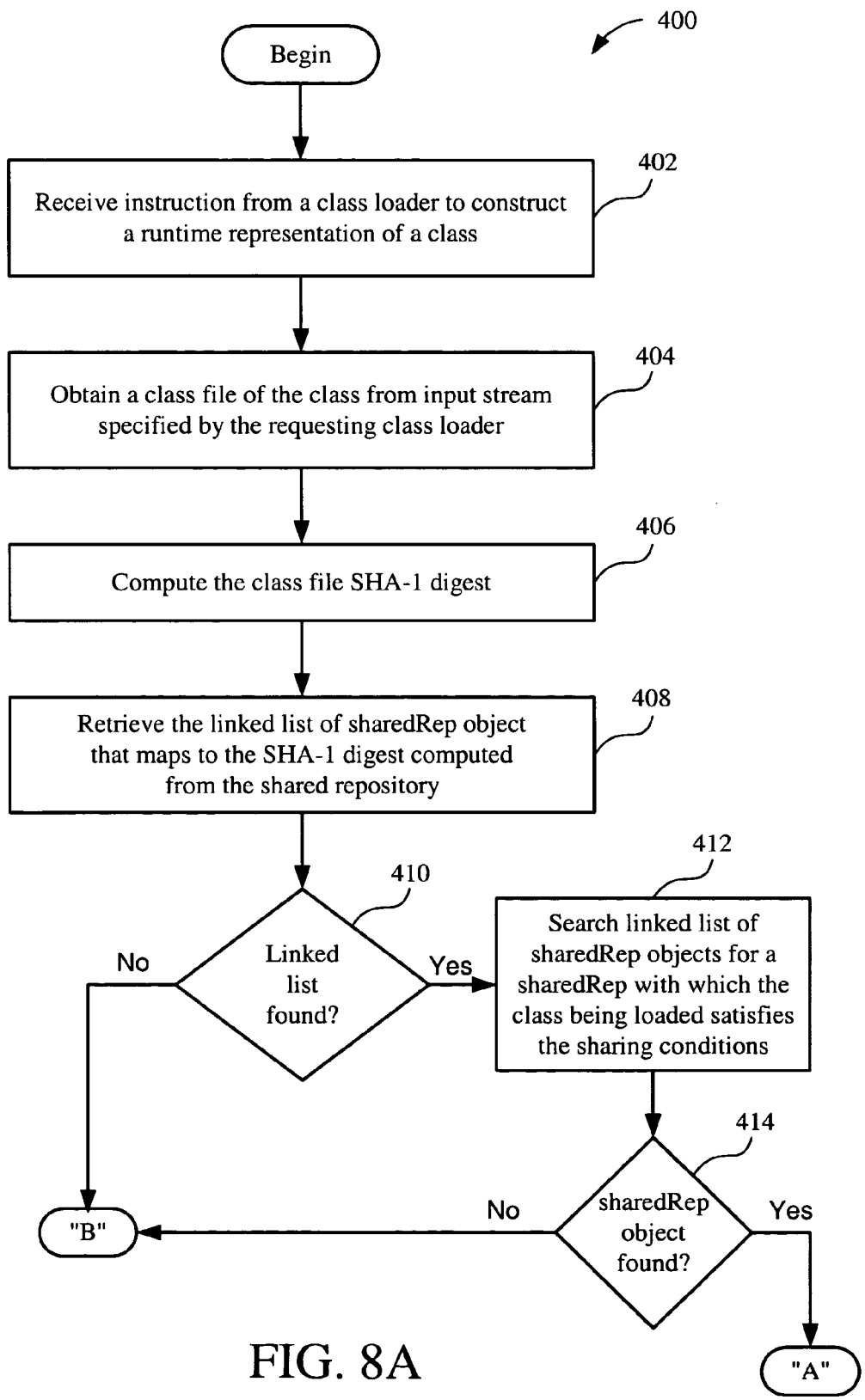
FIG. 8A depicts a flowchart diagram illustrating method operations performed to load a class using an exemplary implementation of the JVM of the present invention, in accordance with still another embodiment of the present invention.

FIG. 8A depicts a flowchart diagram 400 illustrating method operations performed to load a class using an exemplary implementation of the JVM of the present invention, in accordance with one embodiment of the present invention. The method begins in operation 402 in which an instruction is received from a class loader to construct a runtime representation of a class. Next, in operation 404, the class file of the class is obtained by the JVM from the specified input stream. In operation 406, the SHA-1 digest of the class file is computed.

Proceeding to operation 408, the linked list of all the shared representations of classes built using class files of equal value are retrieved from the shared class repository, using the SHA-1 digest computed in operation 406. In one embodiment, the SHA-1 digest is a hash key. In one example, the format of the class file may not need verification prior to computing the SHA-1 digest. For instance, if the specified class file does not conform to a valid class file format, the digest of the class file cannot be mapped to an entry in the shared class repository.

In operation 410, a determination is made as to whether a linked list of sharedRep objects has been found in the shared class repository using the SHA-1 digest of the specified class file. If a linked list of sharedRep objects has not been found, the method continues to "B". Otherwise, the method proceeds to operation 412 wherein the method scans the list of sharedRep objects to find a sharedRep object together with which the class being defined can satisfy all the sharing conditions. In operation 414, a determination is made as to whether a sharedRep object satisfying the sharing conditions has been found. If such sharedRep object has not been found, the method continues to "B," otherwise the method continues to "A."

Figure 8B:
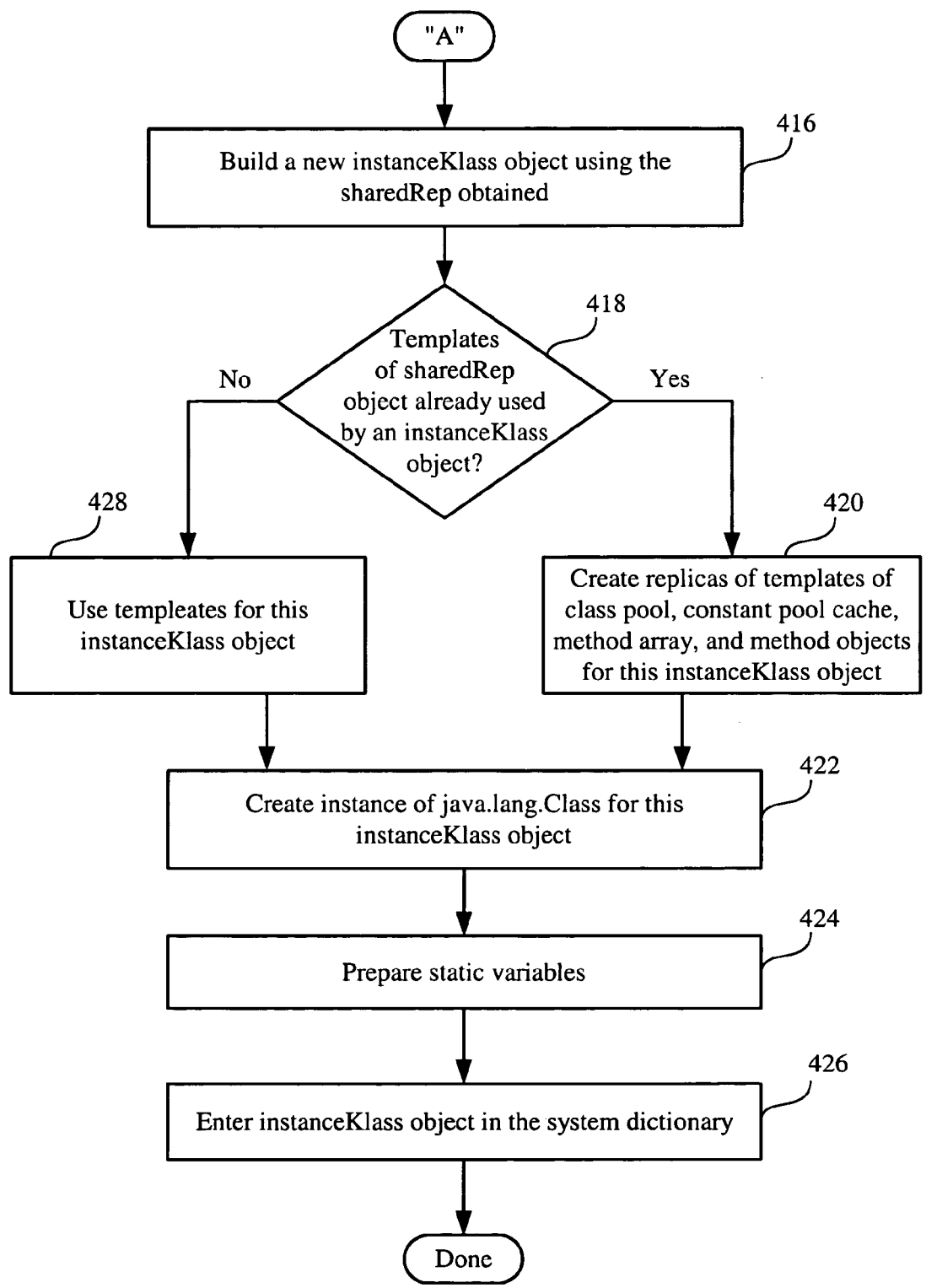
FIG. 8B is a flowchart diagram illustrating method operations performed to build a new instanceKlass object (i.e., a loader dependent representation of a class type) using the sharedRep object (i.e., the loader independent SRR of a class type) obtained from the shared class repository, in accordance with still another embodiment of the present invention.

Continuing to FIG. 8B, a flowchart diagram illustrating method operations performed to build a new instanceKlass object (i.e., a loader dependent representation of a class type) using the sharedRep object obtained from the shared class repository is provided, in accordance with one embodiment of the present invention. The method begins in operation 416, in which a new instanceKlass object is built using the sharedRep obtained. In one example, the new instanceKlass object is allocated and filled using the information from the share-dRep object obtained. Next, in operation 418, a determination is made as whether a template of loader dependent runtime representation of a class is being used by another instanceKlass object.

If the template is not being used, the method continues to operation 428 wherein the template is assigned to the instanceKlass object and is initialized for use by the instanceKlass object being created. However, if the template has already been used by another instanceKlass object, the method continues to operation 420 wherein the method replicates the template for the class pool, the constant pool cache, and methods array. The method objects are also created and initialized for use by the new instanceKlass object. Next, in operation 422, a corresponding instance of java.lang.Class is created, followed by operation 424 in which the static variables of the instanceKlass object are created. In operation 426, the instanceKlass object that has been created is entered in the system dictionary.

Figure 8C:
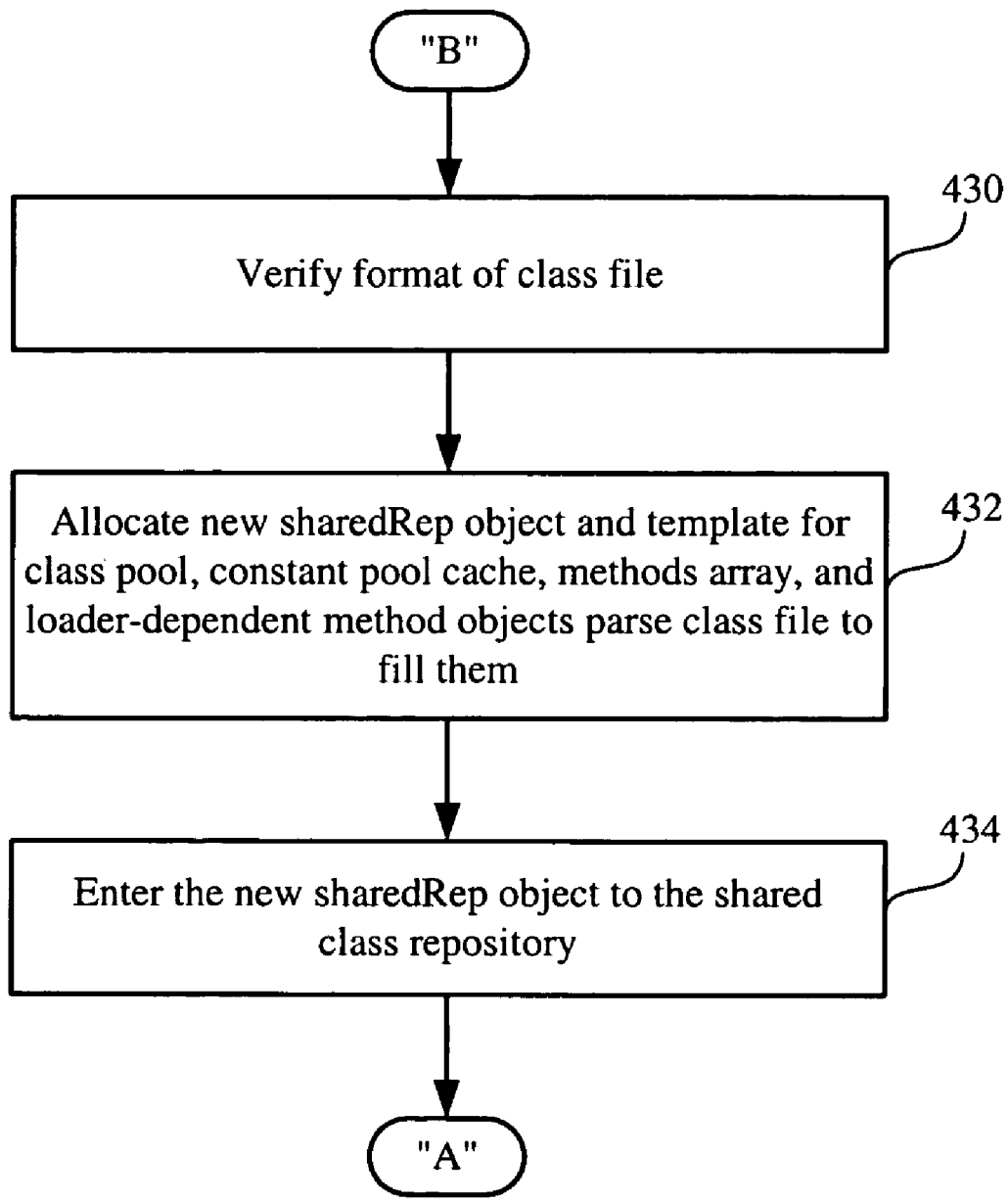
FIG. 8C depicts a flowchart diagram illustrating method operations performed when the SHA-1 digest does not map to a sharedRep object, in accordance with still another embodiment of the present invention.

FIG. 8C depicts a flowchart diagram illustrating method operations performed when the SHA-1 digest does not map to a sharedRep object, in accordance with one embodiment of the present invention. The method begins in operation 430 in which the format of the class file is verified, followed by operation 432 in which a new sharedRep object is allocated. In the same manner, sharedMethod objects and shared constant pool as well as and templates for class pool, constant pool cache, methods array, and methods objects are allocated filled with information obtained from parsing the class file. In one example, the entries of the class pool are set in an unresolved format. According to one implementation, setting up the remaining components can be postponed until the class is linked (e.g., preparing a constant pool cache, initializing the virtual method table, etc.). Next, in operation 434, the sharedRep object is entered in the shared class repository using the SHA-1 digest computed earlier as a hash key.

In one embodiment of the present invention, parsing the class file to create a new sharedRep object may be avoided if a sharedRep object created from a class file having an identical value already exists. Instead of parsing the class file, the new sharedRep object can be obtained by cloning an existing sharedRep object created from a class file having a value identical to the value specified to create the new sharedRep object. In such a scenario, portions of the new sharedRep object that depend on the super sharedRep object (e.g., offset to instance variables, vtable index of methods, etc.) and the unimplemented abstract methods may be changed to reflect the new sharing conditions associated with the new sharedRep object. Specifically, if the sharedRep object selected for cloning differs from the sharedRep object that should be created by the third sharing condition (i.e., objects have the same super sharedRep object), the table of unimplemented method should be changed. If the sharedRep object selected for cloning differs from the sharedRep object to be created by the second sharing condition (i.e., objects have different super sharedRep objects), the table of unimplemented method and data that depends on the super sharedRep object should be changed. In one exemplary cloning implementation, a need to clone the shared constant pool may not exist and the shared constant pool can be shared by the sharedRep object that is being cloned and the sharedRep object that has been cloned.

Figure 9A:
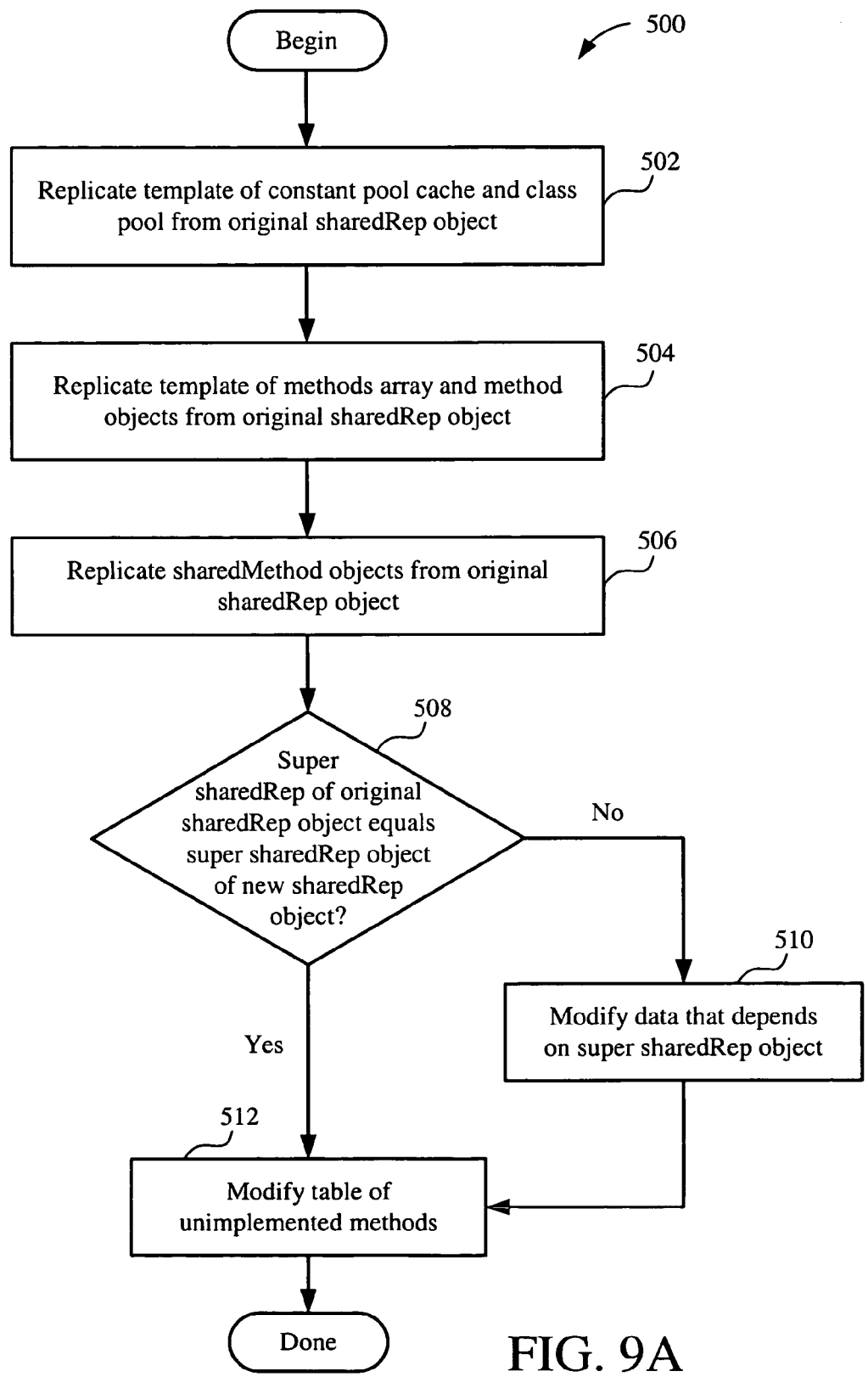
FIG. 9A is a flowchart diagram illustrating method operations performed to create a new sharedRep object by an exemplary implementation of the JVM of the present invention by cloning a sharedRep object created with a class file having an identical value, in accordance with still another embodiment of the present invention.

FIG. 9A is a flowchart diagram 500 illustrating method operations performed to create a new sharedRep object by cloning a sharedRep object created with a class file having an identical value, in accordance with one embodiment of the present invention. The method begins in operation 502 in which the class pool and constant pool cache templates of the original sharedRep object are replicated and initialized for use by the cloned sharedRep object. Next, in operation 504, the template for the method arrays and the method objects of the original sharedRep object are replicated. Proceeding to operation 506, the sharedMethod objects of the original sharedRep object are replicated and initialized for use by the cloned sharedRep object. In operation 508, a determination is made as to whether the cloned sharedRep object has the same super sharedRep object as the original sharedRep object. If the super sharedRep objects are the same, the method continues to operation 288 in which the table of unimplemented methods is changed. Otherwise, data that depends on the super sharedRep object may be changed in operation 510. The method then proceeds to operation 512 in which the table of unimplemented methods is modified.

Figure 9B:
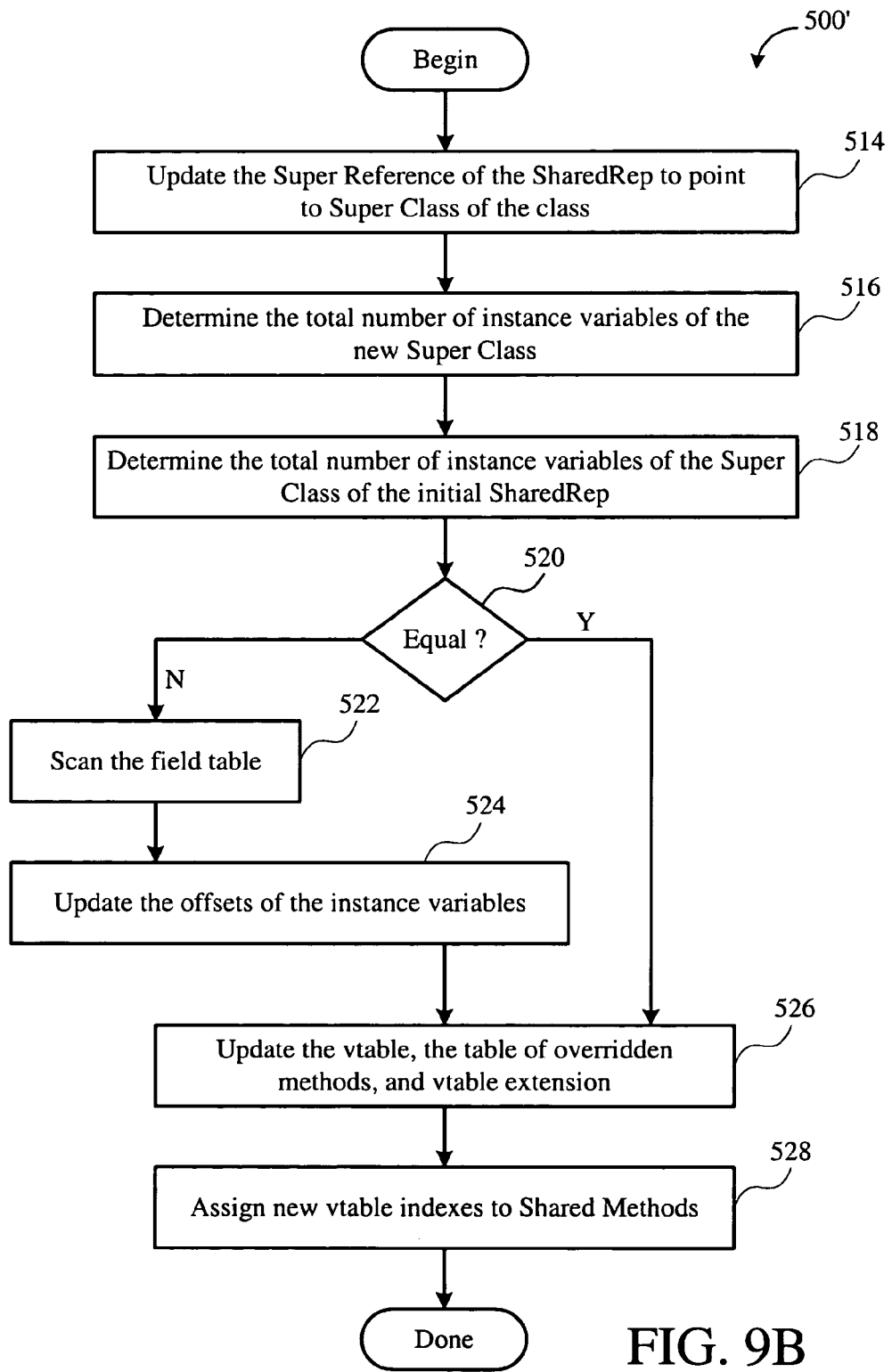
FIG. 9B is a flowchart diagram depicting method operations performed on an exemplary cloned sharedRep object by an exemplary implementation of the JVM of the present invention, in accordance with still another embodiment of the present invention.

FIG. 9B is a flowchart diagram 500' depicting method operations performed on an exemplary cloned sharedRep object by an exemplary implementation of the JVM of the present invention, in accordance with another embodiment of the present invention. The method begins in operation 514 in which the reference to the super sharedRep object of the cloned sharedRep object is updated so as to point to the appropriate sharedRep object. In one embodiment of the present invention, the reference to the appropriate super sharedRep object of the cloned sharedRep object is obtained from the instanceKlass object of the super class of the class being defined and on behalf of which the cloned sharedRep object is created. Next, in operation 516, the total number of instance variables of the new super class is determined followed by operation 518 in which the total number of instance variables of the initial sharedRep object is determined.

Continuing to operation 520, a determination is made as to whether the total number of instance variables of the new super class is equivalent to the total number of instance variables of the super class of initial sharedRep object. If the total number of instances are not equal, the operation continues to operation 522 in which the field table of the initial sharedRep object is scanned followed by the operation 524 in which the offsets of the instance variables are updated. If the total number of instances are equal, the method continues to operation 526 wherein the vtable length, the table of overridden methods, and vtable extension table are updated. Next, in operation 528, the shared methods may be assigned new vtable indices.

In one embodiment, to share the runtime representation of methods of a class, particularly, the bytecodes of methods, bytecode interpretation is made loader re-entrant. Loader reentrant bytecode interpretation requires that the main memory representation of bytecodes not include loader dependent data (e.g., operands of bytecode instruction is designed to be meaningful for all loaders sharing the bytecodes, etc.), or reflect loader-dependent states (e.g., a bytecode is configured to reflect a particular class initialization state, etc.). Instead, any particular loader-dependent data or loader dependent state is retrieved and evaluated at bytecode interpretation time using loader-independent data. Furthermore, techniques utilized to eliminate class initialization tests (e.g., "quickening," etc.) may not be used to support loader reentrance.

In one example, efficient access to loader dependent values of a resolved symbolic link can be performed by using the loader dependent constant pool cache and the class pool associated with the class loader dependent representation of the current class (i.e., the class defining the method being executed). For instance, upon entering an invoked method, a reference to the loader dependent constant pool cache is stored at a dedicated location of the stack frame being prepared to execute the invoked method. In one embodiment, the dedicated location can be a register assigned to cache the constant pool cache. From the constant pool cache, the interpreter can efficiently retrieve the associated loader dependent class pool. To trigger link resolutions and class initializations, in one embodiment, "barriers" which are defined as short sequences of instructions can be used.

According to one implementation, when utilizing an appropriate encoding of the content of the constant pool cache, implementing a barrier can incur minor overhead. For instance, when implemented on SPARC processors, barriers can add one instruction to the interpretation of bytecode instructions. In one aspect of the present invention, to use barriers, resolved information is initialized to a distinguishable value. It must be appreciated that the resolved information is normally obtained from a constant pool cache upon interpreting a bytecode instruction. However, in accordance with one exemplary embodiment, the resolved information can be initialized to a value that denotes an unresolved link, for when link resolution barriers (LRB) are used. In another embodiment, the resolved information can be initialized to a value that denotes an uninitialized class, for when class initialization barriers (CIB) are used.

In one embodiment of the present invention, a LRB can be added to parts of an exemplary implementation of the bytecode interpreter performing the interpretation of bytecode instructions that refer to symbolic links. In an exemplary implementation of the JVM of the present invention, such bytecode instructions include the quickened versions of getfield, putfield, invokevirtual, invokespecial, and invokeinterface. The LRB is configured to efficiently test whether the symbol being referred to by a bytecode instruction has been resolved by the current class loader.

Figure 10A:
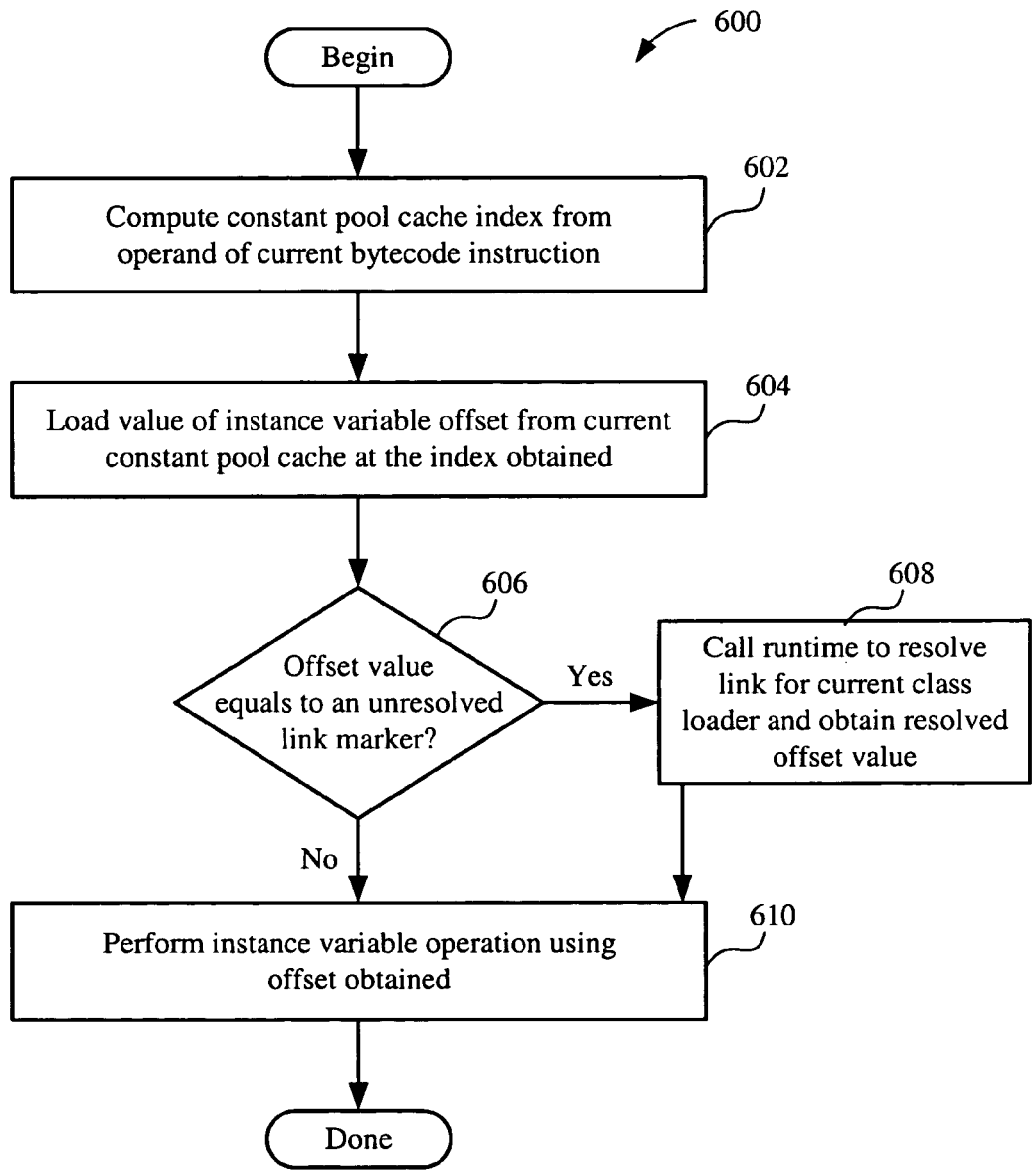
FIG. 10A includes a flow chart diagram of method operations performed to determine whether the symbolic link referenced by a bytecode instruction manipulating an instance variable is resolved by a current class loader, in accordance with still another embodiment of the present invention.

FIG. 10A includes a flow chart diagram 600 of method operations performed to determine whether the symbolic link referenced by a bytecode instruction manipulating an instance variable is resolved by the current class loader, in accordance with one embodiment of the present invention. By way of example, instruction manipulating instance variables can be getfield or putfield, or the quickened version of getfield or putfield. The method begins in operation 602 in which an index to the current constant pool cache is computed from the operand of the bytecode instruction. Next, in operation 604, the value of an offset within the instance variable holder is loaded from the current constant pool cache at the index obtained. In one example, the index can be obtained from the bytecode instruction operand.

Proceeding to operation 606, a determination is made as to whether the offset value loaded from the current constant pool cache is equal to an unresolved link marker. In one example, the unresolved link marker is a distinguishable value used to denote the unresolved link. If the values are not equal, the method continues to operation 610 wherein instance variable manipulation is performed. However, if the offset loaded from the current constant pool is equivalent to an unresolved link marker, the method continues to operation 608 wherein a call to the runtime is issued so as to resolve the symbolic link for the current class loader. In one embodiment, the runtime can replace the unresolved link maker at the entry of the constant pool cache with the resolved offset value. In this manner, subsequent uses of the constant pool cache entry that may result in a call to the runtime can be avoided. Furthermore, the resolved offset value can be returned. Thereafter, the method proceeds to operation 610 in which instance variable operation is performed using the offset value obtained. In one example, by using a value of −1 as the value of the unresolved marker, the LRB for bytecode instructions can be implemented to manipulate instance variables on the SPARC processor as a single branch on negative register value. As a result, one instruction is added to the interpretation of the bytecode, as shown in the exemplary code in Table 2.

TABLE 2

Exemplary code including link resolution barrier

| ld [Rcache + (header size + 2*wordsize)], Roffset | // Retrieve offset to field |
|---|---|
| brgz,pt Roffset, resolved | // LRB |
| ld [ Robject + Roffset], Rvalue | // load field |

Figure 10B:
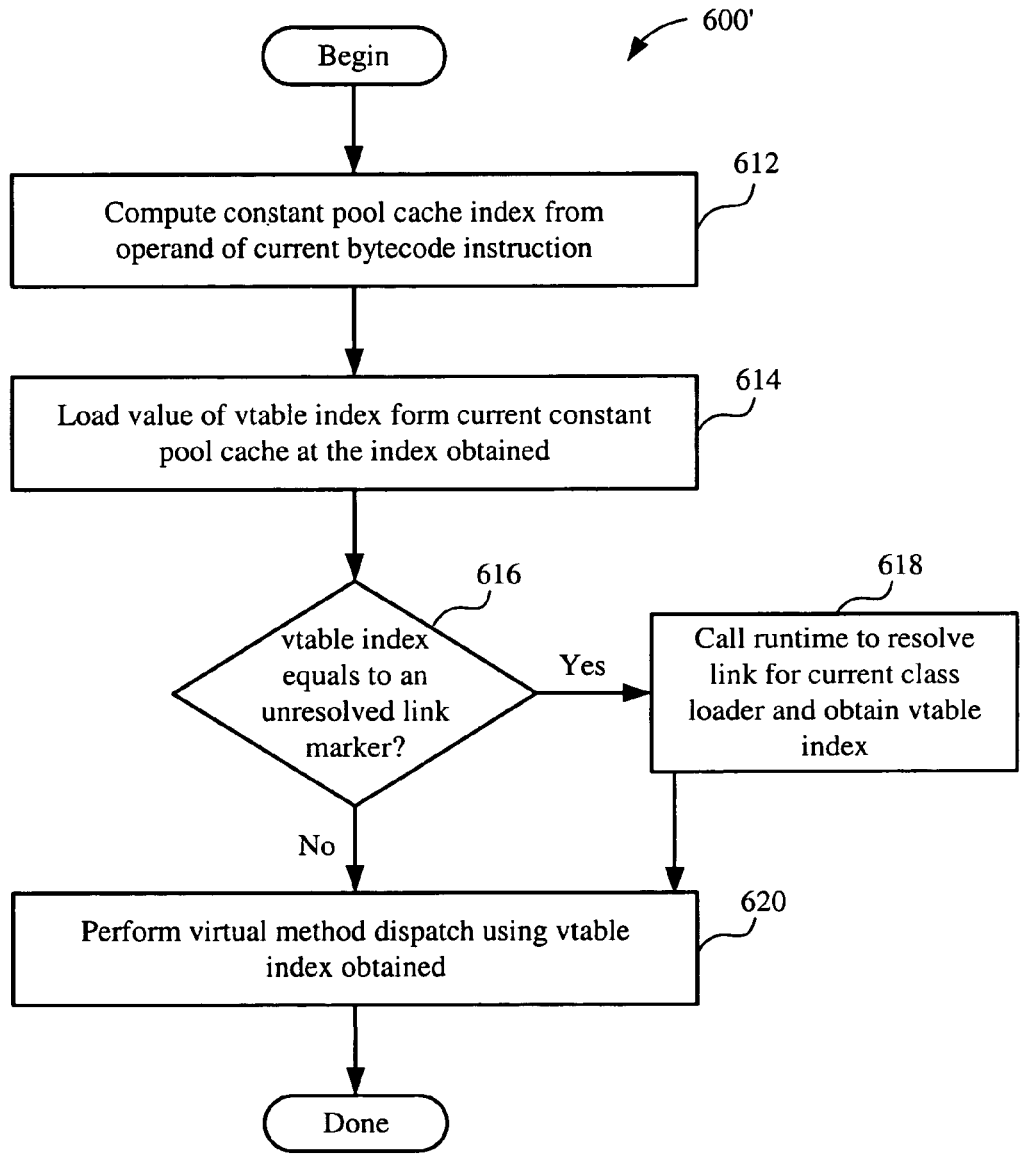
FIG. 10B is a flowchart diagram of method operations performed to obtain the resolved information encoded by the symbolic link in an operand of an invokevirtual method, in accordance with still another embodiment of the present invention.

Reference is made to FIG. 10B including a flow chart diagram 600' of method operations performed to obtain the resolved information encoded by the symbolic link in an operand of an invokevirtual method, in accordance with one embodiment of the present invention. An invokevirtual bytecode instruction implements a virtual method dispatch mechanism, wherein the method to be invoked is obtained via a table driven lookup mechanism. In one example, the resolved information expected by the bytecode is an index to a virtual table. The pointer to the method object encapsulating the bytecode of the method to be invoked is stored in the virtual table.

The method begins with operation 612 in which an index to the current constant pool cache is computed from the operand of the bytecode instruction. Next, in operation 614, the value of a vtable index is loaded from the current constant pool cache at the index obtained. In operation 616, a determination is made as to whether the vtable index loaded from the current constant pool cache is equal to a distinguishable value used to denote an unresolved link. If the values are not equivalent, the method continues to operation 620 wherein the virtual method dispatch is performed. In one example, the virtual method dispatch is performed by using the vtable index to index the virtual table. In one instance, the virtual table is embedded in the instanceKlass object and is referenced from the object targeted by the method invocation. However, if the vtable index loaded from the current constant pool is an unresolved link marker, the method continues to operation 618 in which a call to the runtime is issued so as to resolve the symbolic link for the current class loader. For instance, the symbolic link can be resolved into a loader dependent method object, from which a sharedMethod object can be reached to obtain the vtable index for the method. The runtime can then replace the unresolved link maker at the entry of the constant pool cache with the vtable index obtained in operation 620. In this manner, subsequent uses of the constant pool cache entry can avoid calling the runtime.

Figure 11A:
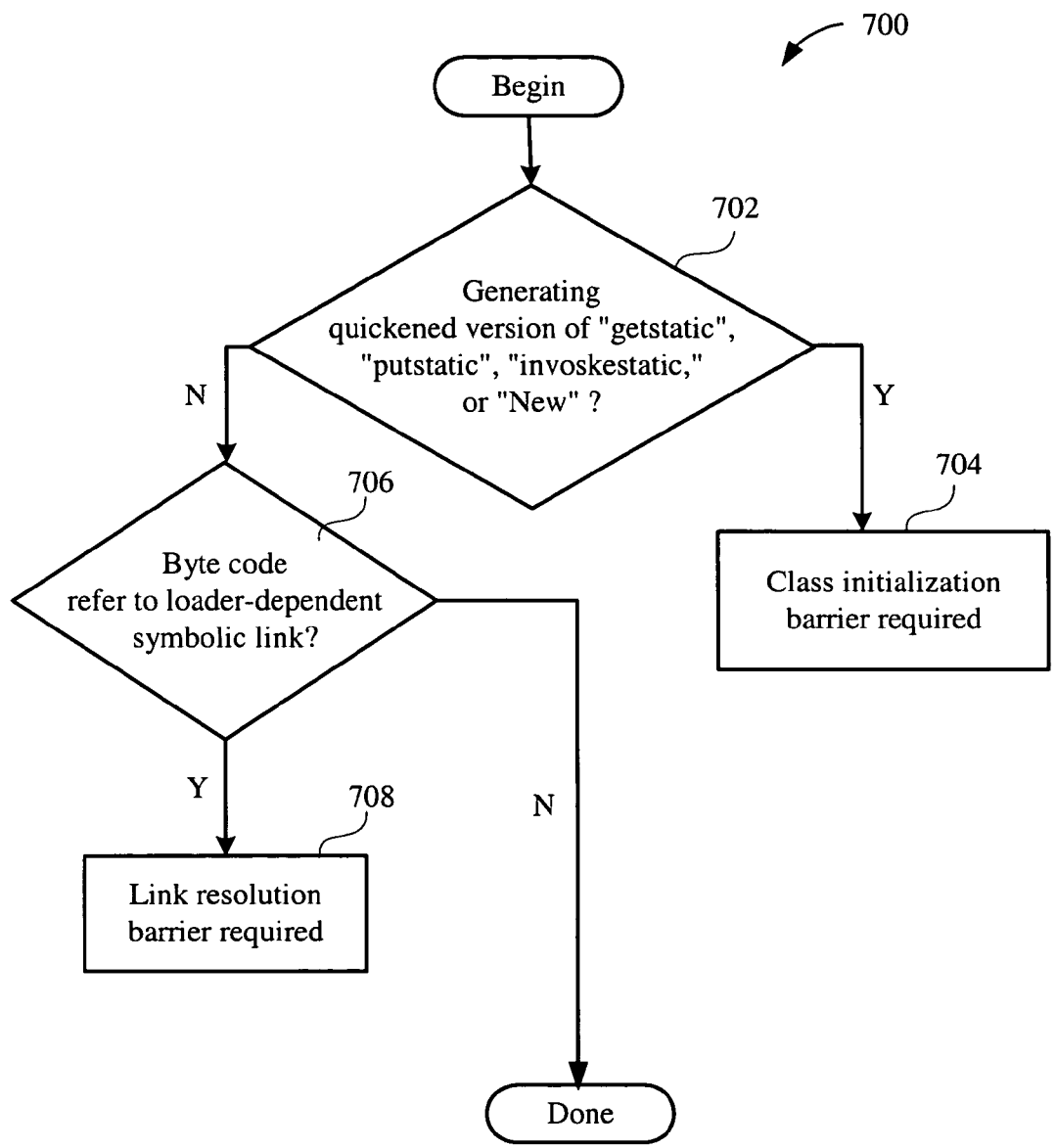
FIG. 11A is a flow chart diagram of method operations performed to determine whether a link resolution barrier or a class initialization barrier should be implemented, in accordance with still another embodiment of the present invention.

According to one embodiment, link resolution barriers may be redundant in the presence of class initialization barriers (CIB). Specifically, when a class initialization barrier is required for interpreting a bytecode instruction, a link resolution barrier may not be needed. In one example, class initialization barrier may be needed in the implementation of bytecode instructions that may result in a first use of a class by a software program. FIG. 11A depicts a flow chart diagram 700 of exemplary method operations performed to determine whether a link resolution barrier or a class initialization barrier should be implemented, in accordance with one embodiment of the present invention. The method begins in operation 702 in which a decision is made as to whether a quickened version of getstatic, putstatic, invokestatic, or new is being generated. If the quickened bytecode for getstatic, putstatic, invokestatic, or new is being generated, the method continues to operation 704 in which class initialization barrier is implemented. Otherwise, the method continues to operation 706 in which a determination is made as to whether the quickened bytecode being interpreted refers to a class loader dependent symbolic link. If a class loader dependent symbolic link is being implemented, the method continues to operation 708 in which link resolution barrier is implemented.

Figure 11B:
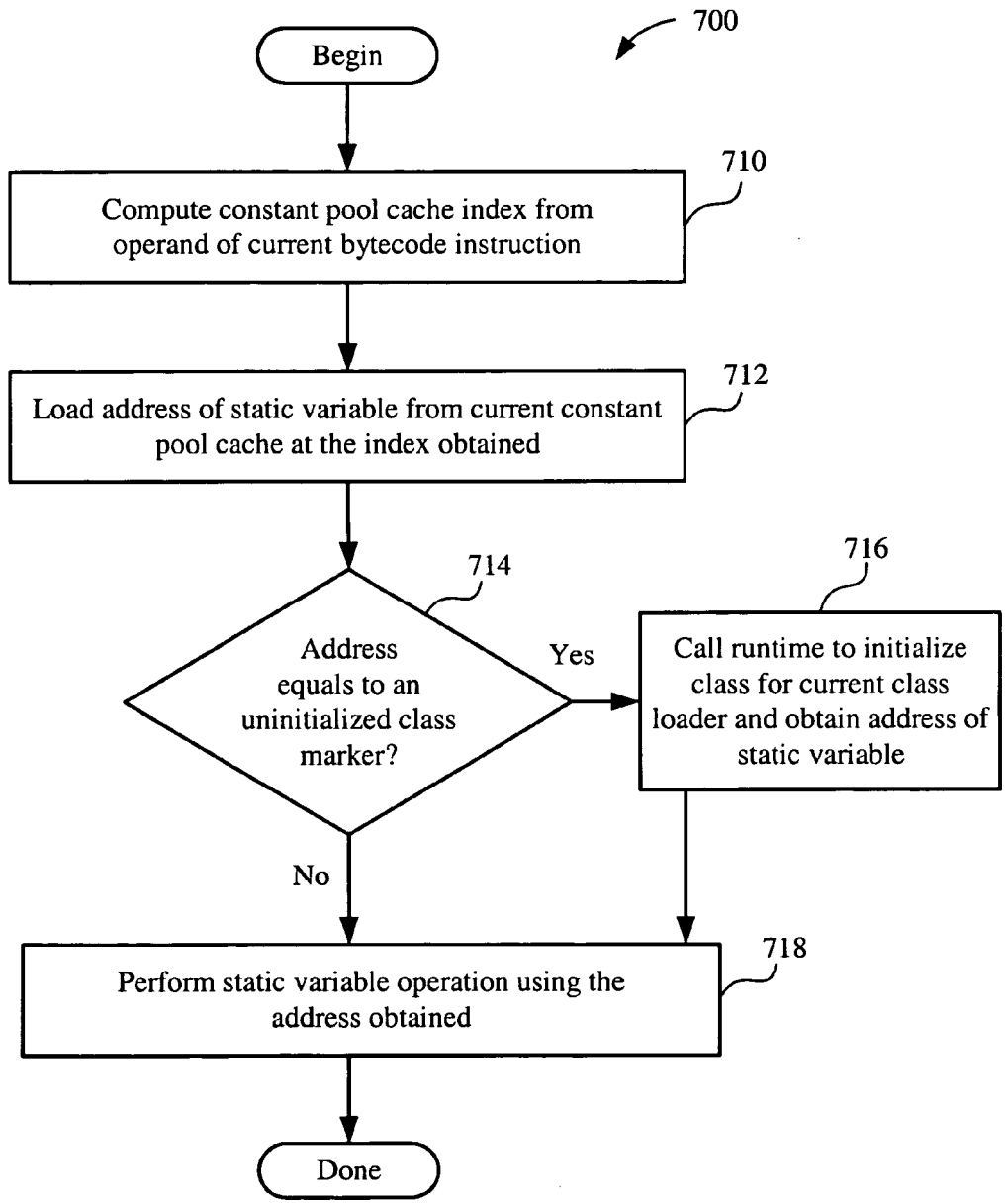
FIG. 11B depicts a flowchart diagram of the method operations performed while interpreting a bytecode instruction manipulating a static variable, in accordance with still another embodiment of the present invention.

FIG. 11B depicts a flowchart diagram 700' of the method operations performed while interpreting a bytecode instruction manipulating a static variable, in accordance with one embodiment of the present invention. By way of example, bytecode instructions manipulating static variable may be getstatic or putstatic, or the quickened versions of getstatic or putstatic. The method begins in operation 710, in which an index to the current constant pool cache is computed from the operand of the bytecode instruction. Next, in operation 712, the address to a static variable is loaded from the current constant pool cache. In one example, the index is obtained from the bytecode instruction operand.

In operation 714, a determination is made as to whether the static variable address loaded from the current constant pool cache is equal to a distinguishable value used to denote an uninitialized class. If the values are not equal, the method continues to operation 718 wherein the static variable manipulation is performed. In one instance, static variable manipulation may be loading of the value of the static variable onto the expression stack when performing a getstatic, or storing a value from the expression stack onto the static variable when performing a putstatic. However, if the address loaded from the current constant pool is equivalent to an uninitialized class marker, the method continues to operation 716 wherein a call is issued to the runtime so as to initialize the class for the current class loader. In one example, calling the runtime may also resolve the symbolic link to the class before initializing the class. The runtime then replaces the uninitialized class marker at the entry of the constant pool cache with the address of the static variable, thus avoiding subsequent calling of the runtime when constant pool cache entry is used. Next, the method proceeds to operation 718. In one example, the NULL pointer value can be used as the uninitialized class marker. In this manner, the CIB for bytecode instructions that manipulate static variables can be implemented on the SPARC processor as a branch on non-zero register value, as shown in the exemplary code depicted in Table 3.

TABLE 3

Exemplary Code using CIB

| ld [Rcache + (header size + 2*wordSize)], Rvar // load static variable address |
|---|
| brnz,a,pt Rvar, initialized //CIB |
| ld [Rvar],Rvalue // Load static variable |

Bytecode instructions for invoking a static method, such as invokestatic and the quickened version of invokestatic, refer to a constant pool cache entry in respective operands. The constant cache pool entry holds a reference to the method representing the static method. In one example, the CIB for such bytecode instructions is implemented by loading the pointer to the method object from the constant pool cache using the index computed from the operand of the invokestatic bytecode instruction. Then, the pointer to the method object from the constant pool cache is compared with an uninitialized class marker. If the value of the pointer equal to that of uninitialized marker, execution can be routed to runtime, enabling initialization of the class defining the static method. Runtime may also resolve the symbolic link to the class before initializing the class. In such a scenario, the constant pool cache entry can be filled with the pointer to the method object representing the static method, before runtime returns the method object pointer to the interpreter. In one example, a NULL pointer value can be used for the uninitialized class marker. In such a situation, the CIB for bytecode instructions invoke a static method that can be implemented on SPARC with a single branch on non-zero register value.

The quickened version of "new" bytecode instructions refers to the class pool entry holding a reference to the instanceKlass object that represents the class for which an instance is to be allocated. In one example, the class pool can be organized so as to hold two sets of information per entry. For instance, the first set of information includes the pointer to the instanceKlass object representing a class type while the second set of information includes the size of the instance of the class. A CIB for the new bytecode instruction is implemented by initializing the size information to the uninitialized class marker whose value is distinguishable from any of the possible instance sizes.

Figure 11C:
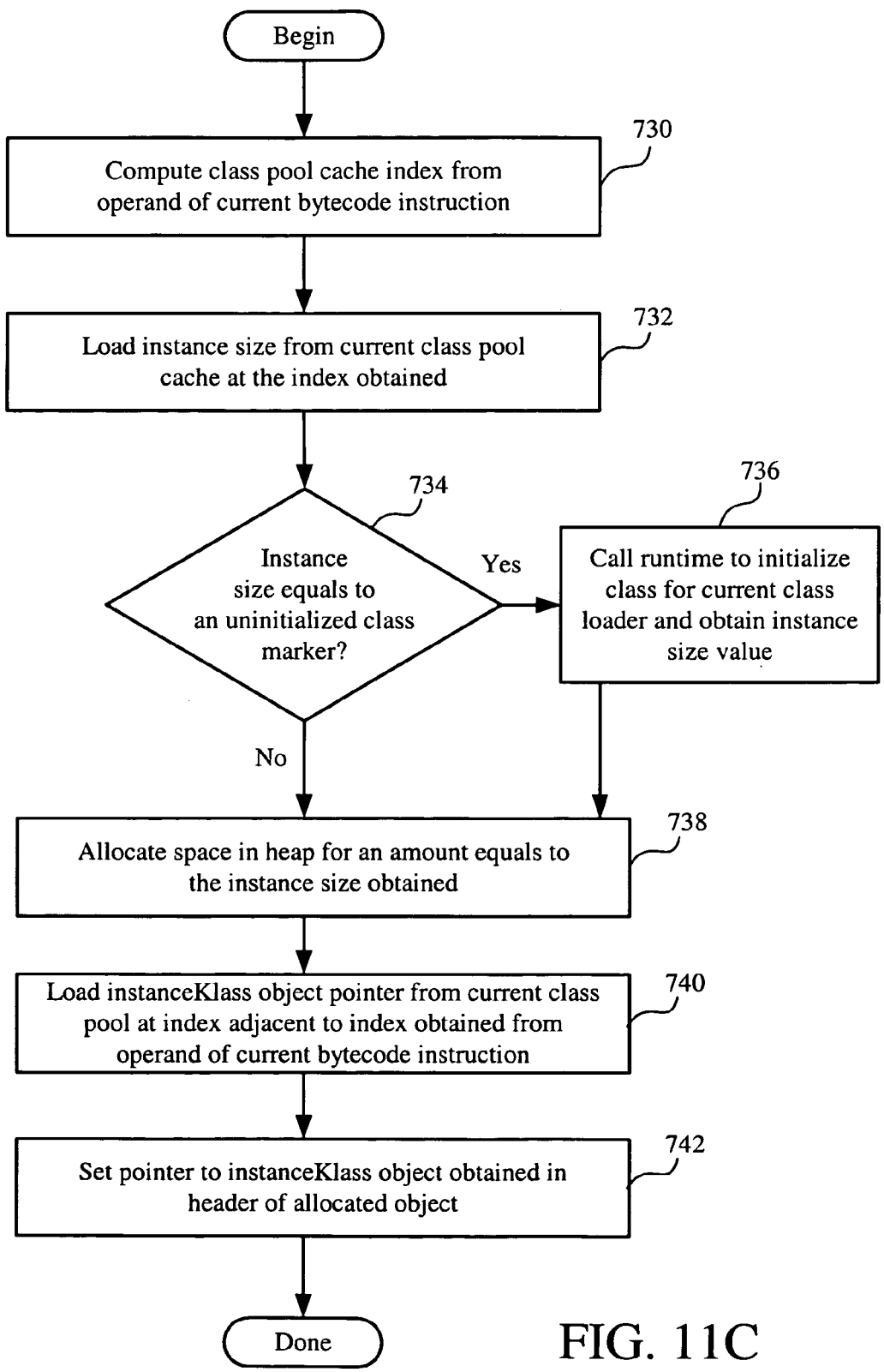
FIG. 11C shows a flow chart diagram of method operations performed when interpreting the quickened version of the new bytecode, in accordance with still another embodiment of the present invention.

FIG. 11CD shows a flow chart diagram 700' of method operations performed when interpreting the quickened version of the new bytecode, in accordance with one embodiment of the present invention. The method begins in operation 730, in which an index to the current class pool is computed from the operand of the bytecode instructions. Next, in operation 732, the instance size is loaded from the current class pool, at the index obtained from the bytecode instruction operand. In a different embodiment, the address of the current class pool can be obtained from the header of the current constant pool cache which address has been stored at a dedicated location upon entering the current method. Proceeding to operation 734, a determination is made as to whether the instance size value loaded from the current class pool is equal to the uninitialized class marker. If the values are not equal, the method continues to operation 738 where the allocation of heap space for the new instance is performed. In one example, the heap spaced allowed is an amount equivalent to the instance size obtained from the class pool.

Continuing to operation 740, the pointer to the instanceKlass object describing the instantiated class is obtained from the class pool entry defined adjacent to the class pool entry from which the instance size was obtained. Then, in operation 742, the pointer to the instanceKlass object is stored in the header of the allocated object. However, if in operation 734 a determination was made that the instance size loaded from the current constant pool is equal to an uninitialized class marker, the method continues to operation 736 wherein a call to the runtime is issued so as to initialize the class for the current class loader. The runtime may also resolve the symbolic link to the class before initializing the class. The runtime then replaces the uninitialized class maker at the entry of the class pool with the size of instances of the class, thus avoiding calling the runtime during subsequent uses of the class pool entry. Next, the method proceeds to operation 738. In one embodiment, the value of −1 can be used as the value of the uninitialized marker. In this manner, the CIB for the new bytecode instruction can be implemented on the SPARC processor as a single branch on negative register value.

As can be appreciated, the present invention describes how an implementation of the JVM can share the runtime representation of classes, including the bytecodes of classes, across multiple defining loaders. Sharing is achieved by separating the part of the runtime representation of a class that depends on loader-specific data (e.g., resolved links, static variables, etc.) from the part of the runtime representation that is loader independent. Furthermore, byte code interpretation is made loader re-entrant by adding link resolution and class initialization barriers as well as efficient access to loader dependent parts of the runtime representation of the class.

The aspects of the present invention are numerous. Most importantly, the amount of main-memory consumed by executing software programs is reduced by allowing the runtime representation of dynamically loaded software components to be shared when certain sharing conditions have been met. In this manner, beneficially, the embodiments of the present invention may avoid dealing with situations wherein object layouts or virtual tables are different. Another aspect of the present invention is that interpretation of bytecode is made class loader re-entrant by re-organizing the runtime representation of classes and adding class initialization and link resolution barriers. In this manner, the bytecode of methods, one of the most space-consuming part of the runtime representation of a class, can be shared across class loaders, while loader dependent part of the runtime representation of classes can be efficiently accessed. Still another aspect of the present invention is that sharing imposes almost no space or processing overhead when classes are defined by a single class loader. Yet another aspect is the capability of the present invention to factor out the cost of loading a class across multiple loaders defining the class.

Yet another aspect is that by avoiding the costs associated with executing a software program each time, the impact on both the start-up time of the Java program as well as the overall performance of the Java program can be significant. In this manner, sharing the main memory runtime representation of classes can reduce both the footprint of Java programs as well as the runtime costs.

Although specific reference is made to terminology defined by Sun Microsystems, Inc., it should be understood that any name could be used for such terms, so long as the desired functionality is achieved. For instance, reference is made to the JVM and class loaders, but in a broad sense, these terms simply define the underlying environment. As such, it must be understood that the system of the present invention can be implemented in any appropriate environment so long as the runtime representation of program components can be shared across a plurality of software components. Accordingly, any reference to a particular standard should be viewed only as exemplary and focus should be placed on the claimed functional operation.

With the above embodiments in mind, it should be understood that, the invention may be practiced with other computer system configurations including hand-held devices, microprocessor systems, microprocessor-based or programmable consumer electronics, minicomputers, mainframe computers and the like. Furthermore, the invention may employ various computer-implemented operations involving data stored in computer systems. Such operations require physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion. Furthermore, although the present invention primarily targets the Java programming language, it can be used for other programming languages with similar features (e.g., SmallTalk, any object oriented programming language with dynamic loading, etc.).

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for reducing a usage of main memory by a first class loader and a second class loader, the first class loader and the second class loader being capable of dynamically loading a class having a class file, the first class loader being capable of translating the class file into a first class type and the second class loader being capable of translating the class file into a second class type, the method comprising:
   dividing, in the memory, a runtime representation of the first class type into a first loader independent part and a first loader dependent part;
   determining whether a runtime representation of the second class type can use the first loader independent part of the runtime representation of the first class type;
   determining the satisfaction of an unimplemented method condition, the unimplemented method condition being defined by the second class type having same unimplemented methods as the first class type; and
   if the first loader independent part of the runtime representation of the first class type can be used by the runtime representation of the second class type,
      generating a second loader dependent part of the runtime representation of the second class type using the first loader independent part of the runtime representation of the first class type, wherein determining the unimplemented method condition enables the runtime representation of the second class type to use the first loader independent part of the runtime representation of the first class type.

2. A method as recited in claim 1, wherein if the first class type cannot be used by the runtime representation of the second class type, the method further comprises:
   generating from the second class file a second loader dependent part of the runtime representation of the second class type and a second loader independent part of the runtime representation of the second class type.

3. A method as recited in claim 1, the method further comprising:
   determining a satisfaction of a first condition, the first condition being defined by a first class file being the same as a second class file used by the second class loader to define the second class type; and
   determining the satisfaction of a second condition, the second condition being defined by a loader independent part of the runtime representation of a super class type of the second class type being the same as a loader independent part of a runtime representation of a super class type of the first class type;
   wherein determining the first condition, the second condition, and the unimplemented method condition enables the runtime representation of the second class type to use the first loader independent part of the runtime representation of the first class type.

4. A method as recited in claim 1, wherein the class file encodes an architecturally neutral binary representation of the class.

5. A method as recited in the claim 3, wherein the first class file being the same as the second class file used by the second class loader to define the second class type includes,
   identifying that each byte of the second class file is the same as a corresponding byte of the first class file.

6. A method as recited in claim 3, wherein the loader independent part of the runtime representation of the super class type of the second class type being the same as the loader independent part of the runtime representation of the super class type of the first class type includes,
   identifying a reference to the loader independent part of the super class type of the second class type being the same as a reference to the loader independent part of runtime representation of the super class type of the first class type.

7. A method as recited in claim 6, wherein the reference to the loader independent part of the runtime representation of the super class type of the first class type is stored in the loader dependent part of the runtime representation of the super class type of the first class type, and the reference to the loader independent part of the runtime representation of the second class type is stored in the loader dependent part of the runtime representation of the super class type of the second class type.

8. A method as recited in claim 3, wherein a loader independent part of the runtime representation of the class type includes bytecodes of all the methods of the class.

9. A method as recited in claim 8, wherein the second class type having the same unimplemented methods as the first class type includes,
   determining whether the second class type declares an interface;
   if the second class type does not declare the interface, an unimplemented method defined by the second class type is the same as an unimplemented method declared by the first class type; and
   if the second class type declares the interface,
      if the method declared in the interface has the same name and the same signature in the first class type and the second class type, determining one of the first class type and the second class type including a definition of the method, and the first class file and the second class file not including the definition of the method; and
      if the method declared in the interface does not have the same name and the same signature in the first class type and the second class type, identifying the method of the interface declared in the second class type having a definition in the second class type and the first class type.

10. A method as recited in claim 2, wherein generating the second loader dependent part of the runtime representation of the second class type using the loader independent part of the runtime representation of the first class type includes,
   obtaining a template of a first loader dependent runtime representation from the first loader independent part of the runtime representation of the first class type;
   replicating the template of the first loader dependent runtime representation to produce the second loader dependent runtime representation;
   resetting a value of the second loader dependent runtime representation to an initial state; and
   setting a reference to the second loader independent part of the runtime representation in the second loader dependent runtime representation.

11. A method as recited in claim 1, wherein an instance of the first class type includes a reference to the first loader dependent part of the runtime representation of the first class type.

12. A method as recited in claim 11, wherein the first loader dependent part of the runtime representation of the first class type includes:
   a reference to the first loader independent part of the runtime representation of the first class type;
   a reference to the first loader dependent part of a representation of a super class type of the first class type;
   a first loader dependent part table including information computed from symbolic links; and
   an array of references to a first loader dependent part runtime representation of methods.

13. A method as recited in claim 12, wherein the first loader dependent part of the runtime representation of the method includes:
   a reference to a constant pool cache; and
   a reference to a sharable runtime representation of the method.

14. A method as recited in claim 3, wherein the unimplemented method condition is satisfied if the first condition and the second condition have been satisfied and the first class type does not declare an interface.

15. A method as recited in claim 3, wherein determining if the first class file is the same as the second class file comprises:
   computing a Secure Hash Algorithm-1 ("SHA-1") digest for the first class file and the second class file; and
   comparing the SHA-1 digest of the first class file with the SHA-1 digest of the second class file,
   wherein the first class file is the same as the second class file if the SHA-1 digest of the first class file and the SHA-1 digest of the second class file have equivalent values.

16. A method as recited in claim 15, wherein the SHA-1 digest of the first class file of the first class type is stored in a table configured to map the first class name of the first class type to a record including the SHA-1 digest of the first class file and a reference to the first loader independent part of the runtime representation of the first class type.

17. A method as recited in claim 16, wherein the first loader independent part of the runtime representation of the first class type includes a pointer to the loader independent part of the runtime representation of the super class type of the first class type.

18. A method as recited in claim 10, wherein the first loader independent part of the runtime representation of the first class type includes a pointer to the first loader dependent part of the runtime representation of the first class type that is the template.

19. A method for using a first loader independent part of a runtime representation of a software component defined by a first component loader as a second loader independent part of a runtime representation of the software component defined by a second component loader, the method comprising:
   determining in memory a satisfaction of a first condition, the first condition being defined by a first binary representation of the first software component being the same as a second binary representation of the second software component used by the second component loader to define a second software component type;
   determining the satisfaction of a second condition, the second condition being defined by a second loader independent part of a runtime representation of a super software component type of the second software component type being the same as a loader independent part of a runtime representation of a super software component type of the first software component type;
   determining the satisfaction of a third condition, the third condition being defined by the second software component type having the same unimplemented methods as the first software component type; and
   using the first loader independent part of the runtime representation of a software component defined by the first component loader as the second loader independent part of the runtime representation of the software component defined by the second component loader when the first, second, and third conditions are satisfied.

20. A method as recited in the claim 19, wherein the first binary representation of the first software component being the same as the second binary representation of the second software component used by the second component loader to define the second software component type includes,
   identifying that each byte of the second binary representation of the software component is the same as a corresponding byte of the first binary representation of the software component.

21. A method as recited in claim 19, wherein the loader independent part of the runtime representation of the super software component type of the second software component type being the same as the loader independent part of the runtime representation of the super software component type of the first software component type includes,
   identifying a reference to the loader independent part of the runtime representation of the super software component type being the same as a reference to the loader independent part of the runtime representation of the super class type of the first software component type.

22. A method as recited in claim 21, wherein the reference to the loader independent part of the runtime representation of the super software component type of the first software component type is stored in the loader independent part of the runtime representation of the first software component type and the reference to the loader independent part of the runtime representation of the super software component type of the second software component type is stored in the loader independent part of the runtime representation of the software component type of the second software component type.

23. A method as recited in claim 21, wherein a component loader independent part of the runtime representation of a software component type includes a bytecode of a method.

24. A method as recited in claim 19, wherein identifying the second software component type having the same unimplemented methods as the first software component type includes,
   determining whether the second software component type declares an interface;
   if the second software component type does not declare the interface, an unimplemented method defined by the second software component type is the same as an unimplemented method declared by the first software component type; and if the second software component type declares the interface, if the method declared in the interface has the same name and the same signature in the first software component type and the second software component type, including one of a definition in the first software component type and the second software component type and not including the definition in the first software component type and the second software component type, and if the method declared in the interface does not have the same name and the same signature in the first software component type and the second software component type, identifying the method declared in the second software component type having a definition in the second software component type and the first software component type.

25. A computer program embodied on a computer storage device readable medium for reducing a usage of main memory by a first class loader and a second class loader, the first class loader and the second class loader being capable of dynamically loading a class having a class file, the first class loader being capable of translating the class file into a first class type and the second class loader being capable of translating the class file into a second class type, the computer program comprising:

program instructions for dividing a runtime representation of the first class type into a first loader independent part and a first loader dependent part;

program instructions for determining whether a runtime representation of the second class type can use the first loader independent part of the runtime representation of the first class type;

program instructions for determining the satisfaction of an unimplemented method condition, the unimplemented method condition being defined by the second class type having same unimplemented methods as the first class type; and if the first loader independent part of the runtime representation of the first class type can be used by the runtime representation of the second class type, program instructions for generating a second loader dependent part of the runtime representation of the second class type using the first loader independent part of the runtime representation of the first class type, wherein determining the unimplemented method condition enables the runtime representation of the second class type to use the first loader independent part of the runtime representation of the first class type.

26. A computer program embodied on a computer storage device for using a first loader independent part of a runtime representation of a software component defined by a first component loader as a second loader independent part of a runtime representation of the software component defined by a second component loader, the computer program comprising:

program instructions for determining a satisfaction of a first condition, the first condition being defined by a first binary representation of the first software component being the same as a second binary representation of the second software component used by the second component loader to define a second software component type;

program instructions for determining the satisfaction of a second condition, the second condition being defined by a second loader independent part of a runtime representation of a super software component type of the second software component type being the same as a loader independent runtime representation of a super software component type of the first software component type;

program instructions for determining the satisfaction of a third condition, the third condition being defined by the second software component type having the same unimplemented methods as the first software component type; and program instructions for using the first loader independent part of the runtime representation of a software component defined by the first component loader as the second loader independent part of the runtime representation of the software component defined by the second component loader when the first, second, and third conditions are satisfied.

* * * * *